United States Patent
Miyamichi

(10) Patent No.: US 8,779,679 B2
(45) Date of Patent: Jul. 15, 2014

(54) LED LAMP, ILLUMINATION DEVICE INCLUDING THE LED LAMP AND CURRENT CONTROL METHOD OF THE LED LAMP

(71) Applicant: M-System Co., Ltd., Osaka (JP)

(72) Inventor: Saburo Miyamichi, Osaka (JP)

(73) Assignee: M-System Co., Ltd., Osaka (JP)

( * ) Notice: Subject to any disclaimer, the term of this patent is extended or adjusted under 35 U.S.C. 154(b) by 0 days.

(21) Appl. No.: 14/110,541

(22) PCT Filed: Oct. 25, 2012

(86) PCT No.: PCT/JP2012/077644
§ 371 (c)(1),
(2), (4) Date: Oct. 8, 2013

(65) Prior Publication Data
US 2014/0117853 A1    May 1, 2014

(51) Int. Cl.
*H05B 37/02* (2006.01)
(52) U.S. Cl.
CPC .................................. *H05B 37/02* (2013.01)
USPC ............................. 315/259; 315/192; 315/307
(58) Field of Classification Search
CPC ................................ H05B 37/02; H05B 41/16
USPC .......... 315/192, 205, 207, 254, 276, 259, 307
See application file for complete search history.

(56) References Cited

U.S. PATENT DOCUMENTS

| | | | |
|---|---|---|---|
| 2008/0211423 A1 | 9/2008 | Shinmen et al. | |
| 2008/0231211 A1* | 9/2008 | Baarman et al. | 315/294 |
| 2012/0286571 A1* | 11/2012 | Baarman et al. | 307/11 |
| 2012/0319610 A1* | 12/2012 | Yoshinaga | 315/210 |
| 2013/0119928 A1* | 5/2013 | Partovi | 320/108 |
| 2013/0162155 A1* | 6/2013 | Matsuda et al. | 315/200 R |

FOREIGN PATENT DOCUMENTS

| | | | |
|---|---|---|---|
| EP | 1843639 A1 | 10/2007 | |
| JP | 200215886 A | 1/2002 | |
| JP | 20075743 A | 1/2007 | |
| JP | 2009252344 A | 10/2009 | |
| JP | 201034012 A | 2/2010 | |
| JP | 2010212162 A | 9/2010 | |
| JP | 2010212163 A | 9/2010 | |
| JP | 2010218961 A | 9/2010 | |
| JP | 201124331 A | 12/2011 | |
| JP | 2011243331 A | 12/2011 | |
| JP | 3174463 U | 3/2012 | |
| JP | 2012119541 A | 6/2012 | |
| JP | 5108994 B1 | 12/2012 | |
| WO | 2006068055 A1 | 6/2006 | |

* cited by examiner

*Primary Examiner* — Don Le
(74) *Attorney, Agent, or Firm* — Lowe Hauptman & Ham, LLP

(57) ABSTRACT

An LED lamp 20 according to one embodiment of the present invention includes a pair of input terminal parts 20a, 20c, a rectifier circuit unit 22, and an LED unit 24. And the LED lamp 20 has variable inductance units L50, L60 for causing an AC to flow from one of the pair of input terminal parts 20a, 20c to the other input terminal part through the rectifier circuit unit 22, a current detection unit 31 for detecting a magnitude of a DC flowing through the LED unit 24, and an inductance variable control unit 32 for making inductance values of the variable inductance units L50, L60 variable according to the magnitude of the DC detected by the current detection unit 31.

5 Claims, 16 Drawing Sheets

Fig.5

| SWITCH | PATTERN 1 | PATTERN 2 | PATTERN 3 |
|---|---|---|---|
| 32a | OFF | ON | ON |
| 32b | OFF | OFF | ON |
| 32c | OFF | OFF | ON |
| L VALUE | TOTAL OF L51,L52, L61,L62 | TOTAL OF L52,L61, L62 | 0µH |

(a)

Vin (d)

Vg2

(b)

Vg1

(e)

i (c)

Vcs (a)

(b)

(a)

(b)

(c)

LED LAMP, ILLUMINATION DEVICE INCLUDING THE LED LAMP AND CURRENT CONTROL METHOD OF THE LED LAMP

RELATED APPLICATIONS

The present application is a National Phase of International Application Number PCT/JP2012/077644, filed Oct. 25, 2012.

TECHNICAL FIELD

The present invention relates to an LED lamp which can stabilize the magnitude of a current flowing through an LED unit so as to make it fall within a predetermined range even when mounted in place of a fluorescent lamp of a constant power regulation inverter type lighting device distributed on the market, an illumination device including the LED lamp and a current control method of the LED lamp.

BACKGROUND ART

As typical lighting devices for fluorescent lamps (usually referred to as fluorescent lights) used in general, there have conventionally been lighting devices for various fluorescent lamps such as those of the glow starter and rapid start types, which are also known as magnetic ballasts, or the inverter type, also known as an electronic ballast.

The inverter type fluorescent lamp lighting devices, which have rapidly been becoming widespread in recent years in particular, are devices which convert an AC into a DC and then cause an inverter circuit constituted by a transistor, a capacitor, a choke coil and the like to generate a high voltage at a high frequency (20 kHz to 100 kHz) near a resonance frequency.

The high voltage switches on the fluorescent lamp, and thereafter a current flowing through the fluorescent lamp stably lights the fluorescent lamp at a lower voltage.

This is superior to the conventional magnetic ballasts of the glow starter and rapid start types using choke coils in terms of such characteristics as lower power, higher efficiency, usability at both 50 Hz or 60 Hz, lower noise and indiscernibility of flicker.

These will now be explained with reference to the drawings.

FIG. 15(*a*) is a diagram illustrating an example of glow starter type ballasts, FIG. 15(*b*) is a diagram illustrating an example of rapid start type ballasts, and FIG. 15(*c*) is a diagram illustrating an example of inverter type ballasts.

The glow starter type ballast illustrated in FIG. 15 (*a*), which is the most popular type, preheats electrodes (also referred to as filaments; the same hereinafter) of a fluorescent lamp with a starting device using a glow starter (G), so as to enable lighting in a few seconds after switching on.

The rapid start type ballast illustrated in FIG. 15(*b*), which is used in combination with a rapid start type lamp, is lit instantaneously and simultaneously with preheating when switched on.

On the other hand, the ballast of the inverter type lighting device illustrated in FIG. 15(*c*) converts an AC within the AC input voltage range of 85 to 450 V into a DC and then causes an integrated circuit to drive an LED lamp at a high frequency such as that mentioned above (e.g. see page 4 and FIG. 2 of Patent Literature 1).

While a choke coil L is inserted in series with the LED lamp in order to smooth the current flowing through the LED lamp in this case, an electrolytic capacitor (not depicted) is typically inserted in parallel with the LED lamp.

FIG. 16 is a diagram illustrating an example in which two fluorescent lamps are connected in series to a series rapid ballast.

This configuration, in which two fluorescent lamps are connected in series and lit by a single ballast, is simpler and less expensive than one using two single-lamp ballasts or a flickerless ballast.

When powered, the electrodes of each of fluorescent lamps A and B are preheated, and the secondary voltage does not shift to normal discharging but attains a weakly discharging state due to a starting capacitor having a high impedance. The lowered voltage at both ends of the starting capacitor caused by the weak discharge current is applied to the fluorescent lamp B, and starts to discharge the fluorescent lamp B.

When discharging occurs in both fluorescent lamps, the starting capacitor at the high impedance is placed into a substantially non-operating state, so that normal discharging is generated in both fluorescent lamps, and a lit state is maintained.

Thus discharging lamps one by one in such a series connection can light two fluorescent lamps in series at a relatively low secondary voltage, but is disadvantageous in that both of the fluorescent lamps fail to light when one of them is removed for power saving or has burnt out.

Meanwhile, as the above-mentioned ballast of the inverter type lighting device (hereinafter also referred to as inverter type ballast or electronic ballast), which is applied not only to LED lamps but also to conventional fluorescent lamps, a constant current regulation type in which the current flowing through the fluorescent lamp is controlled so as to have a fixed magnitude and a constant power regulation type in which the power supplied to the fluorescent lamp is controlled so as to have a fixed magnitude have widely been known (see, for example, Patent Literatures 2 and 3).

CITATION LIST

Patent Literature

Patent Literature 1: Japanese Laid-Open Patent Application No. 2010-34012
Patent Literature 2: Japanese Laid-Open Patent Application No. 2010-218961
Patent Literature 3: Japanese Laid-Open Patent Application No. 2002-15886

SUMMARY OF INVENTION

Technical Problem

In recent years, for saving power, lengthening the life of lamps and so forth, more and more LED lamps have been seen in use as being mounted to various types of ballasts mentioned above in place of the conventional fluorescent lamps.

In this case, the peak value and frequency of the AC inputted to a pair of input terminal parts of an LED lamp greatly vary depending on types of ballasts of lighting devices to be mounted therewith, which makes it necessary to use respective LED lamps corresponding to the ballasts.

In a glow starter or rapid start type fluorescent lamp lighting device, for example, the output (secondary output) of the ballast is controlled at about 200 V AC so as to correspond to the power-supply-side input of 100 V to 240 V AC (50 Hz or 60 Hz), but since the frequency is not controlled so as to become a high frequency, the frequency is the same as that of the power-supply-side input.

Therefore, in the LED lamp, an inner rectifier circuit rectifies the AC to a DC, so as to enable use as an AC coinciding with the frequency of the power-supply-side input, and then the circuit configuration of an LED unit of the LED lamp (the configuration of a circuit in which a plurality of LEDs are connected; the same hereinafter) is fixed so as to yield a desirable illuminance, and the current flowing through each LED is made to have a magnitude falling within a predetermined range.

Hence, when the ballast of the fluorescent lamp lighting device is of the glow starter or rapid start type, it has conventionally been possible for each LED incorporated therein to be lit by using a dedicated LED lamp attachable to a lamp socket for a fluorescent lamp.

On the other hand, as mentioned above, even when the power-supply-side input is 100 V to 240 V AC (50 Hz or 60 Hz) in the fluorescent lamp lighting device of the inverter type, the output (secondary output) of the ballast has been controlled so as to become a fixed voltage of about 280 V AC (under no load), and since the frequency is under constant-current or constant-power control to fall within the range of 20 kHz to 100 kHz, the circuit configuration of the LED unit of the LED lamp is fixed so as to yield a desirable illuminance, and the current flowing through each LED is made to have a magnitude falling within a predetermined range.

Therefore, when the ballast of the fluorescent lamp lighting device is of the inverter type, it has been necessary to take commensurate measures on the lighting device or LED lamp side that involve changing the circuit construction on the lighting device side, employ a conversion adaptor necessary for direct connection, or the like, in order that the power on the power supply side can directly be supplied to an AC/DC converter (rectifier circuit) incorporated in the LED lamp bypassing (not driving) the inverter type ballast.

Furthermore, when lighting an LED lamp in the inverter type, it has been necessary to replace the existing lamp with a set of a lighting device, incorporating an inverter type ballast therein, and a dedicated LED lamp.

As shown above, the need for selecting and deselecting (verifying compatibility of) LED lamps according to types of lighting devices, or performing additional operations such as circuit construction and direct connection on the lighting device side, has caused users to investigate the current state for implementation and construction, adjust the construction period, and so forth, which are troublesome and increase the implementation cost.

That is, these factors have been hindering LED lamps from being employed in conventional fluorescent lamp lighting devices in homes and offices.

As a result, previous fluorescent lamps continue to be used as they are, thereby greatly obstructing market diffusion of LED lamps, which can greatly contribute to saving power and lengthening the life of lamps.

When an LED lamp is mounted to a constant power regulation inverter type ballast, for example, the value of load impedance limiting the current value flowing through the LED unit of the LED lamp may be lower than that of the fluorescent lamp, thereby causing the inverter type ballast to yield a lower output voltage and a higher output current. As a result, the magnitude of the current flowing through the LED lamp may exceed the predetermined range, thereby failing to yield an appropriate quantity of light.

For driving fluorescent lamps with various rated powers, there are inverter type ballasts with various output voltage settings; depending on kinds of these inverter type ballasts, the magnitude of the current flowing through the LED lamp may fail to stabilize within the predetermined range, whereby an appropriate quantity of light may not be obtained. More specifically, the output voltage of the inverter type ballast is fixed so as to be substantially proportional to the magnitude of the load impedance of the LED lamp, while the output current fluctuates in response to the magnitude of the output voltage. As a result, the magnitude of the current flowing through the LED lamp may fluctuate beyond the predetermined range, thereby failing to yield an appropriate quantity of light.

It is therefore an object of the present invention to provide an LED lamp, an illumination device including the LED lamp and a current control method of the LED lamp which can stabilize the magnitude of a current flowing through an LED unit so as to make it fall within a predetermined range by replacing a previously mounted fluorescent lamp (or LED lamp) even when a ballast of a fluorescent lamp lighting device is of a constant power regulation type.

Solution to Problem

The LED lamp according to the present invention is an LED lamp including a pair of input terminal parts; a rectifier circuit unit rectifying an AC, inputted from the outside to the pair of input terminal parts, to a DC; and an LED unit emitting light by electrification of the DC outputted from the rectifier circuit unit; the LED lamp having a variable inductance unit, in a circuit between the pair of input terminal parts and the rectifier circuit unit, for causing the AC to flow from one of the pair of input terminal parts to the other input terminal part through the rectifier circuit unit; a current detection unit, in a circuit between the rectifier circuit unit and the LED unit, for detecting a magnitude of the DC flowing through the LED unit; and an inductance variable control unit for making an inductance value of the variable inductance unit variable according to the magnitude of the DC detected by the current detection unit.

This LED lamp can make the inductance value of the variable inductance unit variable according to the magnitude of the DC detected by the current detection unit by replacing a previously mounted fluorescent lamp (or LED lamp) even when the ballast of the fluorescent lamp lighting device is a constant power regulation inverter type ballast, whereby the output voltage is fixed so as to be substantially proportional to the value. As a result, the magnitude of the current flowing through the LED unit can be stabilized so as to fall within a predetermined range.

When the magnitude of the current flowing through the LED unit is lower than a predetermined range, for example, the magnitude of the current flowing through the LED unit can be stabilized so as to fall within the predetermined range by utilizing the fact that lowering the inductance value of the variable inductance unit decreases the output voltage and increases the output current of the constant power control inverter type ballast. When the magnitude of the current flowing through the LED unit is higher than a predetermined range, on the other hand, the magnitude of the current flowing through the LED unit can be stabilized so as to fall within the predetermined range by utilizing the fact that enhancing the inductance value of the variable inductance unit increases the output voltage and decreases the output current of the constant power control inverter type ballast. That is, desirable effects can be obtained by utilizing such a characteristic of the control system as to supply a constant power to the LED lamp in the constant power control inverter type ballast.

In addition to the foregoing configuration, the LED lamp of the present invention may further include a threshold element, in a circuit between the pair of input terminal parts and the rectifier circuit unit, for causing the AC to flow from one of the pair of input terminal parts to the other input terminal part through the rectifier circuit unit; wherein the threshold element is adapted to short-circuit both ends thereof after a lapse of a predetermined time from when the AC exceeding a predetermined threshold is inputted to the pair of input terminal parts from the outside; and wherein the inductance variable control unit makes the inductance value of the variable inductance unit variable according to the magnitude of the DC detected after the both ends of the threshold element are short-circuited.

For example, there are some kinds of constant power control inverter type ballasts which, in order to grasp states of fluorescent lamps (e.g. to check whether or not the fluorescent lamps are attached to the load side) at the time of starting outputs, set the output voltage lower than the rated value beforehand, cause a low slight current to flow that is unable to obtain an appropriate quantity of light, and monitor the magnitude of the output current at that time, subsequently raise the output voltage to a predetermined range, and then perform constant power regulation.

In the foregoing configuration, however, both ends of the threshold element are short-circuited after a lapse of a predetermined time from when inputting the AC exceeding a predetermined threshold to the pair of input terminal parts from the outside, and the inductance value of the variable inductance unit is made variable according to the magnitude of the DC flowing through the LED unit after short-circuiting both ends of the threshold element, so that, even in such kinds of inverter type ballasts, only the current flowing through the LED unit to be detected (the current in a normal lighting state) is detected, without performing erroneous control.

In addition to the foregoing configuration, the LED lamp of the present invention may further include a circuit interrupt unit, in a circuit between the pair of input terminal parts and the rectifier circuit unit, capable of interrupting the AC flowing from one of the pair of input terminal parts to the other input terminal part through the rectifier circuit unit; wherein the circuit interrupt unit interrupts the AC when the magnitude of the DC detected by the current detection unit is higher than a predetermined upper limit or lower than a predetermined lower limit.

Even when an overcurrent flows through the LED lamp because of changes over time or some abnormalities on the ballast side, for example, this configuration can block the AC inputted to the pair of input terminal parts from the outside from flowing to the rectifier circuit unit on the safe side. When the detected magnitude of the DC is very low due to some abnormalities such as those in the state of mounting the LED lamp to the ballast and electric connection failures, on the other hand, the AC inputted to the pair of input terminal parts from the outside can be blocked from flowing to the rectifier circuit unit on the safe side.

In addition to the foregoing configuration, the LED lamp of the present invention may further include a PWM control unit, in a circuit between the rectifier circuit unit and the LED unit, capable of PWM control of a current flowing through the LED unit according to a duty ratio; wherein the PWM control unit is switchable between a case where the PWM control of the current flowing through the LED unit is performed, and a case where PWM control of the current flowing through the LED unit is not performed, according to a frequency of the external AC inputted to the pair of input terminal parts; and wherein, in the case where the PWM control unit does not perform PWM control, the current detection unit detects the magnitude of the DC flowing through the LED unit, and the inductance variable control unit makes the inductance value of the variable inductance unit variable according to the magnitude of the DC.

This configuration makes it possible to light the LED lamp for illumination, which is capable of being lit by pulse-driven PWM control, by replacing a previously mounted fluorescent lamp (or LED lamp), regardless of whether a ballast of the fluorescent lamp lighting device is of the glow starter, rapid start or inverter lighting type. When mounted to the inverter type ballast, i.e. when the PWM control unit does not perform PWM control, this configuration can stabilize the magnitude of the current flowing through the LED unit so as to make it fall within a predetermined range.

In other words, when the frequency of the AC inputted from the pair of input terminal parts is low, e.g. a utility power frequency of 50 Hz or 60 Hz, as in the case where the ballast of a fluorescent lamp lighting device is of the glow starter or rapid start type, the PWL control unit in the LED lamp acts to stabilize the current flowing through the LED unit. When the frequency of the AC inputted from the pair of input terminal parts is high, e.g. 20 kHz to 100 kHz as in the case where the ballast is of the inverter type, on the other hand, the inductance value of the variable inductance unit is made variable according to the magnitude of the DC flowing through the LED unit, so as to act to stabilize the current flowing through the LED unit.

Furthermore, in addition to the foregoing configuration, the LED lamp may be one wherein the PWM control unit performs the PWM control of the current flowing through the LED unit by driving a pulse at a frequency higher than a predetermined frequency when a frequency of an external AC inputted to the pair of input terminal parts is lower than the predetermined frequency, and does not perform the PWM control of the current flowing through the LED unit when the frequency of the external AC inputted to the pair of input terminal parts is higher than the predetermined frequency.

This configuration makes it possible to light the LED lamp for illumination, which is capable of being lit by driving a pulse at a frequency higher than the predetermined frequency, by replacing the previously mounted fluorescent lamp (or LED lamp), regardless of whether the ballast of the fluorescent lamp lighting device is of the glow starter, rapid start or inverter lighting type.

Therefore, this can easily eliminate the need for selecting and deselecting (verifying compatibility of) LED lamps according to types of lighting devices, or performing additional operations such as circuit construction and direct connection on the lighting device side, that cause users to investigate the current state for implementation and construction, adjust the construction period, and so forth, which are troublesome and increase the implementation cost.

As a result, the obstacles to LED lamps being employed in conventional fluorescent lamp lighting devices (or LED lighting devices) in homes and offices are overcome.

This makes it possible for LED lamps, which can greatly contribute to saving power and lengthening the life of lamps, to become widespread in the market.

When the ballast of a fluorescent lamp lighting device is of the glow starter or rapid start type, for example, the frequency of the AC inputted from the pair of input terminal parts is a utility power frequency of 50 Hz or 60 Hz.

Therefore, the current flowing through the LED unit is PWM controlled by driving pulses at a frequency higher than at least a predetermined frequency (e.g. 5 kHz), thus enabling the PWM control unit to repeatedly switch the current flowing through the LED unit on/off at high speed, and a flicker-free, stable effective value (RMS value) to be obtained.

When the ballast of the fluorescent lamp lighting device is of the inverter type, on the other hand, the AC inputted from the pair of input terminal parts has a high frequency of 20 kHz to 100 kHz, and thus the PWM control unit does not perform PWM control, the frequency rectified by the rectifier circuit unit is used as is (a ripple voltage waveform part superposed on the DC having a double frequency in the case of full-wave rectification), and thus the current flowing through the LED unit can obtain a flicker-free, stable effective value (RMS value) by control (e.g. PWM control) of the external inverter type ballast.

This reliably prevents the same kind of control systems from being superposed outside and inside of the LED lamp, and eliminates causes giving rise to inconsistencies such as instability in the magnitude of the current flowing through the LED unit.

Furthermore, in addition to the foregoing configuration, the LED lamp may be one wherein a bypass circuit unit is provided between a cathode-side terminal of the LED unit and a ground-side output terminal of the rectifier circuit unit, wherein the bypass circuit unit includes a switching device and a high-pass filter circuit outputting a drive voltage for the switching device, and wherein the switching device does not allow a current to flow from the cathode-side terminal of the LED unit to the ground-side output terminal of the rectifier circuit unit when the AC inputted to the pair of input terminal parts has a frequency lower than the predetermined frequency, and allows a current to flow from the cathode-side terminal of the LED unit to the ground-side output terminal of the rectifier circuit unit when the AC inputted to the pair of input terminal parts has a frequency higher than the predetermined frequency.

This configuration allows the AC inputted from the input terminal of the rectifier circuit, when higher than the predetermined frequency, to bypass (circumvent) the switching device of the PWM control unit for performing PWM control of the current flowing through the LED unit, thereby preventing the PWM control unit incorporated in the LED lamp from performing the PWM control.

Furthermore, in addition to the foregoing configuration, the LED lamp may be one wherein the switching device of the bypass circuit unit is an N-channel MOSFET controlling a current flow between drain and source terminals according to a gate voltage inputted to a gate terminal, wherein the drain terminal is connected to the cathode-side terminal of the LED unit, wherein the source terminal is connected to the ground-side output terminal of the rectifier circuit unit, wherein the gate terminal is connected to any one of the input terminals of the rectifier circuit unit through the high-pass filter circuit, and wherein the high-pass filter circuit outputs a gate voltage to the gate terminal driven so as to allow a current to flow from the drain terminal to the source terminal when the AC inputted to the pair of input terminal parts has a frequency higher than the predetermined frequency, and outputs a gate voltage to the gate terminal driven so as not to allow a current to flow from the drain terminal to the source terminal when the AC inputted to the pair of input terminal parts has a frequency lower than the predetermined frequency.

According to this configuration, the N-channel MOSFET functions as the switching device of the bypass circuit, thus enabling a current to flow to the LED unit with sufficient margin, and the current can be inhibited from flowing into the PWM control unit.

That is, since the PWM control unit is bypassed (circumvented) when the AC inputted from the input terminals of the rectifier circuit unit has a frequency higher than the predetermined frequency, the current flowing through the LED unit can be prevented from flowing into the PWM control unit, and prevents the PWM control unit from performing PWM control.

Furthermore, in addition to the foregoing configuration, the LED lamp may be one wherein the high-pass filter circuit includes a first capacitor, a first resistor connected in series to the first capacitor so as to have one terminal connected to one terminal of the first capacitor, a first diode connected in a forward direction from the other terminal of the first resistor to the gate terminal, a second capacitor connected between the source and gate terminals, a second resistor connected between the source and gate terminals, a zener diode connected in a forward direction from the source terminal to the gate terminal, and a second diode connected in a forward direction from the source terminal to the other terminal of the first resistor, wherein the other terminal of the first capacitor is connected to any one of the input terminals of the rectifier circuit unit.

This configuration enables a filter function that allows only a current having a frequency higher than the predetermined frequency to pass to the next stage, and causes the switching device of the bypass circuit reliably to switch on/off according to the frequency.

As a result, the current flows to the subsequent stage only when the AC inputted from the input terminals of the rectifier circuit unit is higher than the predetermined frequency, thus enabling the N-channel MOSFET serving as the switching device to be reliably switched on, and enabling prevention of PWM control of the current flowing through the LED unit.

Furthermore, in addition to the configurations mentioned above, the LED lamp may be one wherein the predetermined frequency is a frequency higher than 65 Hz but lower than 20 kHz.

This configuration makes it possible to clearly distinguish between a frequency (60±1 Hz) in the case where the ballast is of the glow starter or rapid start type, and a frequency (20 kHz to 100 kHz) in the case of the inverter type distributed on the market, even when taking account variations including precision of power supply frequency, thus enabling switching between the case where the pulse-driven PWM control is performed, and the case where it is not performed, according to the results of distinguishing, and enabling lighting of the LED lamp for illumination capable of being lit by driving a pulse at a high frequency.

Since the predetermined frequency to be distinguished is a frequency which is lower than 20 kHz and falls within an audible region (a frequency band which can be sensed by humans as sound), a frequency in a higher frequency band used for driving pulses for PWM control is less likely to be felt as uncomfortable noise.

Furthermore, the illumination device of the present invention is one including the LED lamp having any of the configurations mentioned above.

This illumination device includes the foregoing LED lamp and thus can stabilize the magnitude of the current flowing through the LED unit so as to make it fall within a predetermined range by simply replacing a previously mounted fluorescent lamp (or LED lamp) even when the ballast of the fluorescent lamp lighting device is a constant power regulation inverter type ballast.

It is not necessary to newly provide a ballast for modulating the LED unit on the illumination device side, and simply supplying an external AC to a pair of input terminal parts can light it as illumination.

Furthermore, the illumination device itself is mounted with no ballast and thus has a simplified configuration, thereby easily eliminating the need for selecting and deselecting (verifying compatibility of) LED lamps according to types of lighting devices, or performing additional operations such as circuit construction and direct connection on the lighting device side, that cause users to investigate the current state for implementation and construction, adjust the construction period, and so forth, which are troublesome and increase the implementation cost.

The current control method of the LED lamp according to the present invention is a current control method of an LED lamp including a pair of input terminal parts; a rectifier circuit unit rectifying an AC, inputted from the outside to the pair of input terminal parts, to a DC; and an LED unit emitting light by electrification of the DC outputted from the rectifier circuit unit, the method including the steps of causing the AC, in a circuit between the pair of input terminal parts and the rectifier circuit unit, to flow from one of the pair of input terminal parts to the other input terminal part by way of the rectifier circuit unit through a variable inductance unit; detecting, in a circuit between the rectifier circuit unit and the LED unit, a magnitude of the DC flowing through the LED unit; and making an inductance value of the variable inductance unit variable according to the detected magnitude of the DC; wherein the magnitude of the DC flowing through the LED unit is controlled so as to fall within a predetermined range.

This current control method of the LED lamp can make the inductance value of the variable inductance unit variable according to the magnitude of the DC detected by the current detection unit by replacing a previously mounted fluorescent lamp (or LED lamp) even when the ballast of the fluorescent lamp lighting device is a constant power regulation inverter type ballast, whereby the output voltage is fixed so as to be substantially proportional to the value. As a result, the magnitude of the current flowing through the LED unit can be stabilized so as to fall within a predetermined range.

Advantageous Effects of Invention

According to the LED lamp, the illumination device including the LED lamp and the current control method of the LED lamp of the present invention, it is possible to stabilize the magnitude of a current flowing through an LED unit so as to make it fall within a predetermined range by replacing a previously mounted fluorescent lamp (or LED lamp) even when a ballast of a fluorescent lamp lighting device is of a constant power regulation inverter type.

BRIEF DESCRIPTION OF DRAWINGS

FIG. 5 is a chart illustrating variable control patterns of the variable inductance units.

FIG. 14(a) is a diagram illustrating a part of a circuit which makes a threshold voltage variable according to the magnitude of a high voltage (HV), while FIG. 14(b) is an overall block diagram in which an LED lamp in an embodiment is connected in series to a series rapid type ballast.

DESCRIPTION OF EMBODIMENTS

Embodiments of the present invention will be explained in detail below with reference to the drawings.

Embodiments

Figure 1:
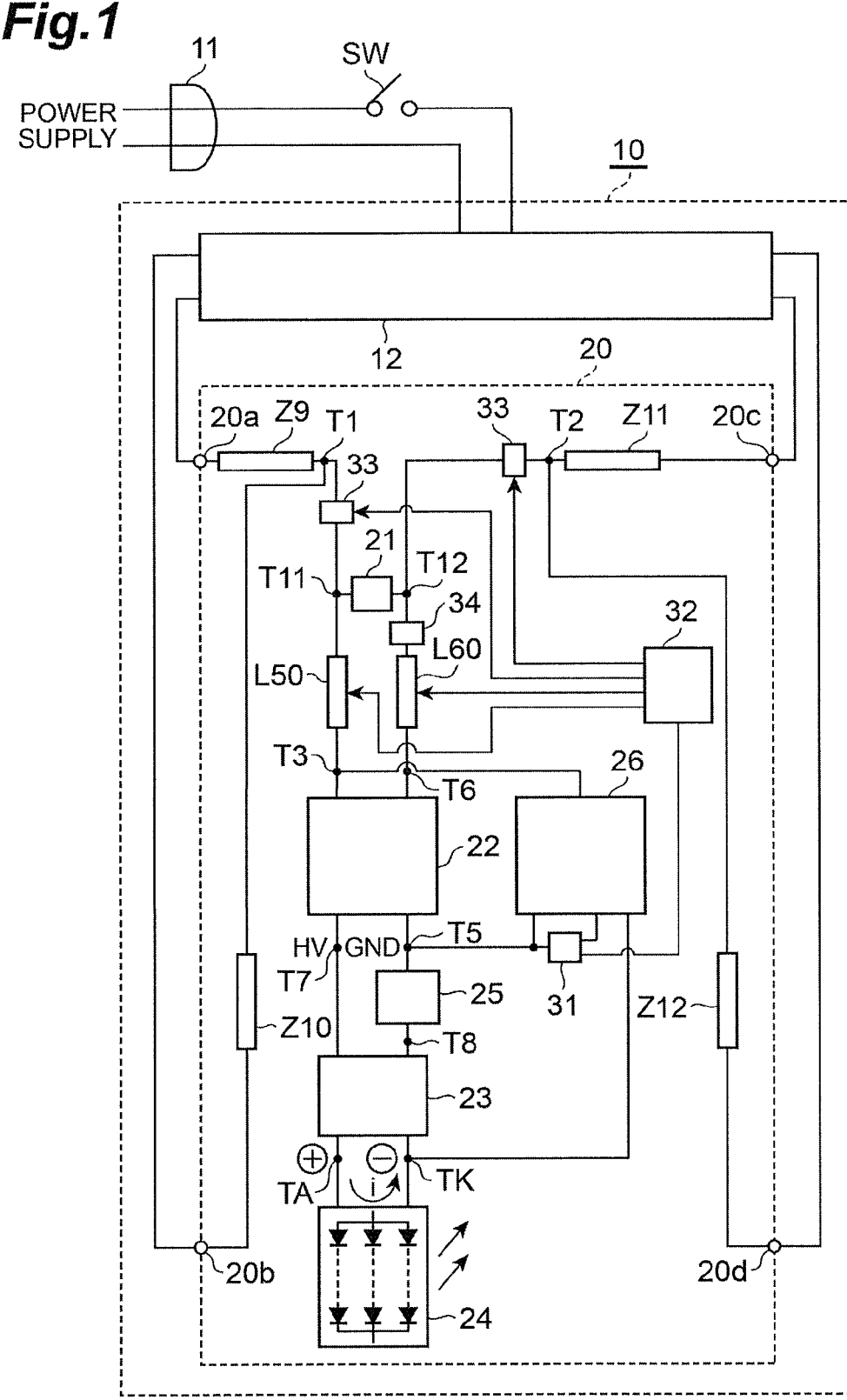
FIG. 1 is a block diagram illustrating the whole circuit of the illumination device according to an embodiment of the present invention.
Figure 2:
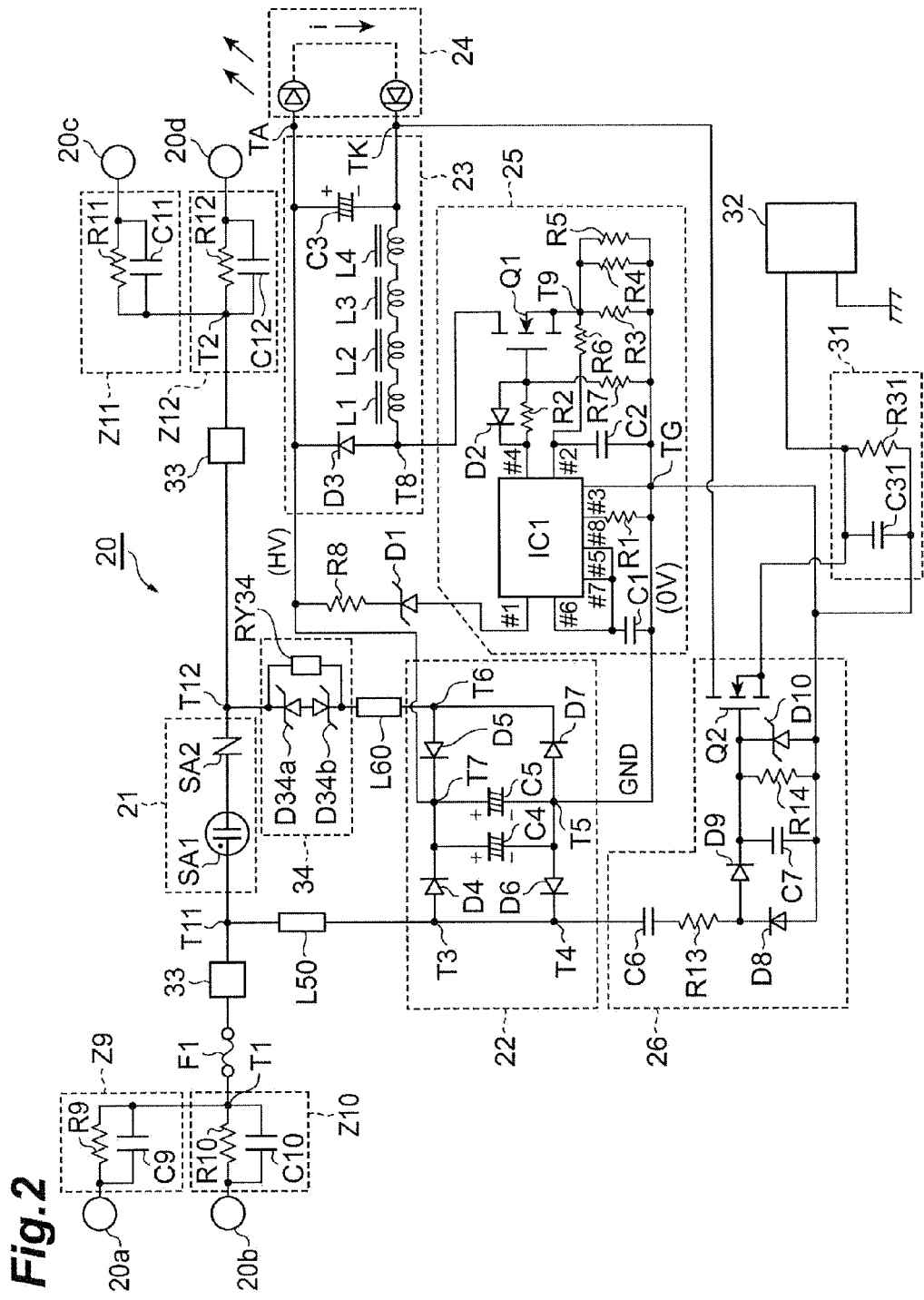
FIG. 2 is a circuit diagram of the LED lamp in an embodiment of the present invention.
Figure 3:
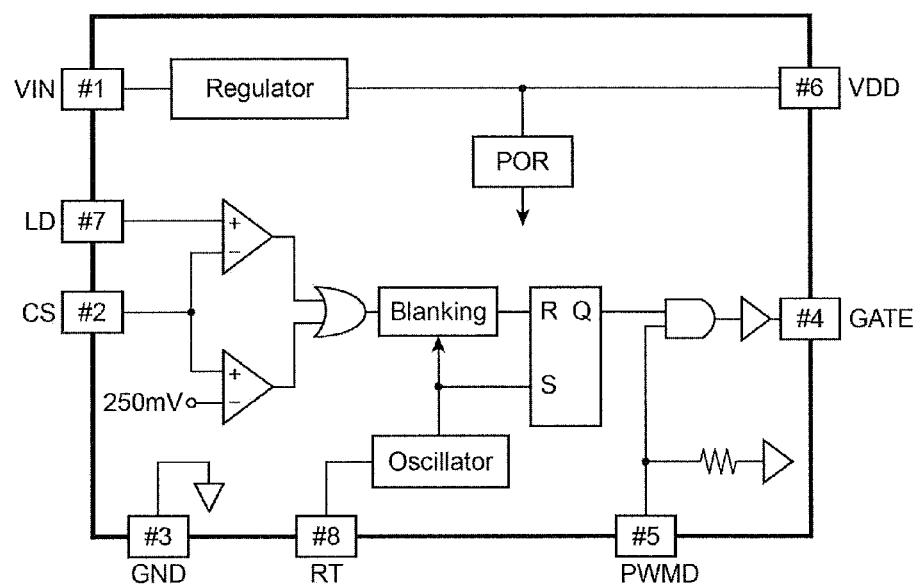
FIG. 3 is a block diagram illustrating the inside of an integrated circuit IC1.
Figure 4:
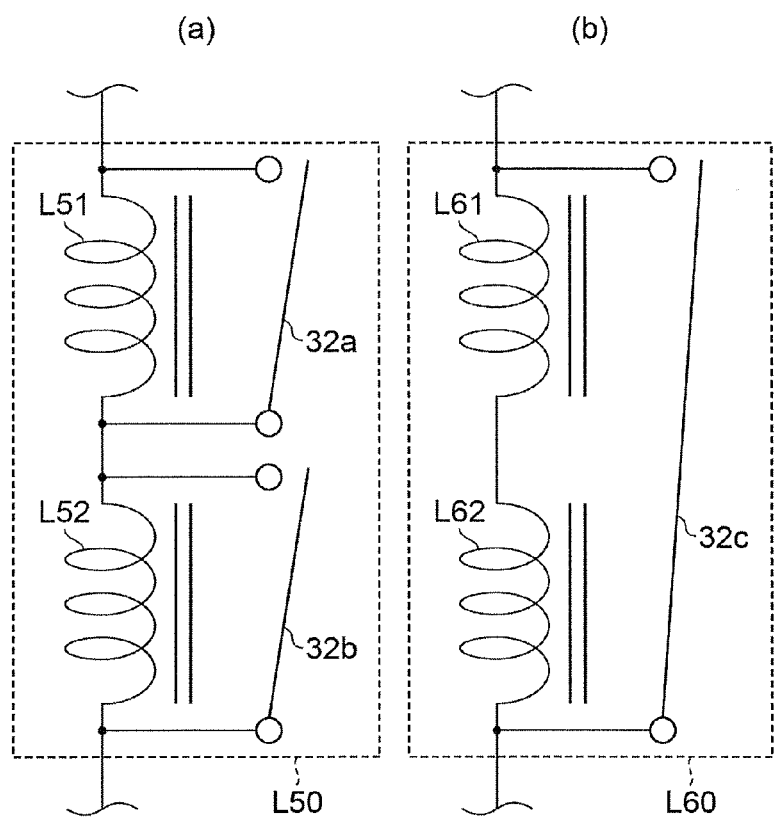
FIGS. 4(a) and 4(b) are circuit diagrams illustrating variable inductance units.
Figure 6:
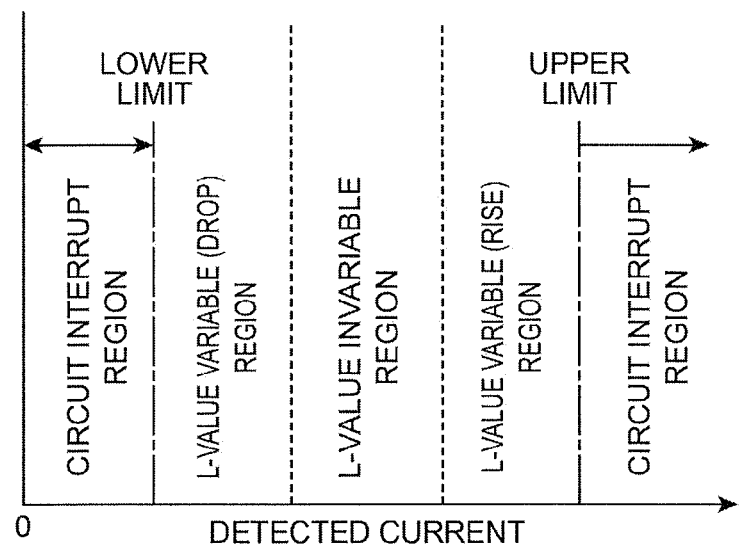
FIG. 6 is a diagram illustrating variable regions and circuit interrupt regions of an inductance value with respect to a detected current.
Figure 7:
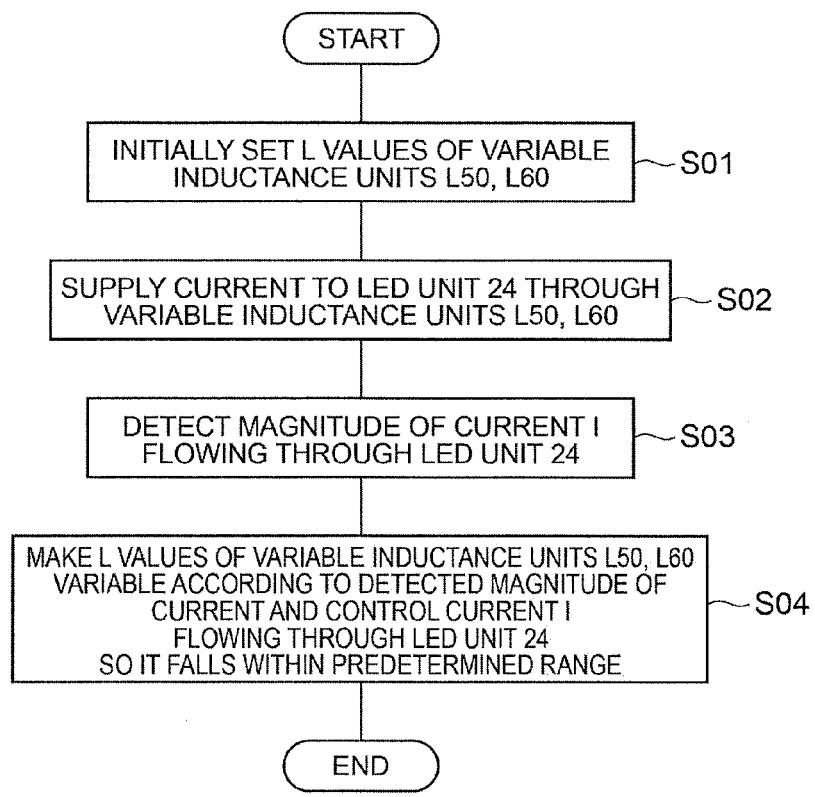
FIG. 7 is a flowchart illustrating a current control method of an LED lamp in an embodiment of the present invention.
Figure 12:
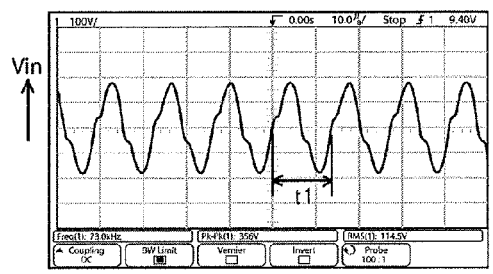
FIGS. 12(a), 12(b), 12(c), 12(d) and 12(e), respectively, are waveforms of the input voltage Vin, the voltage Vg1 at the gate terminal of the switching device Q1, the current sensor terminal voltage Vcs of the integrated circuit IC1, the voltage Vg2 at the gate terminal of the switching device Q2, and the current i flowing through the LED unit 24.
Figure 12:
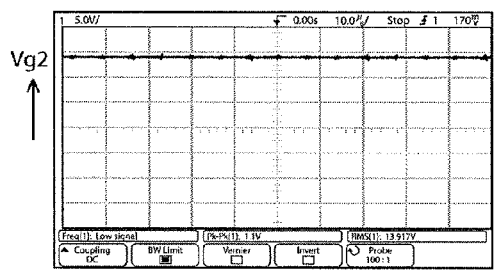
Figure 12:
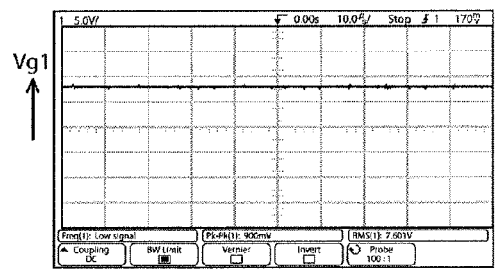
Figure 12:
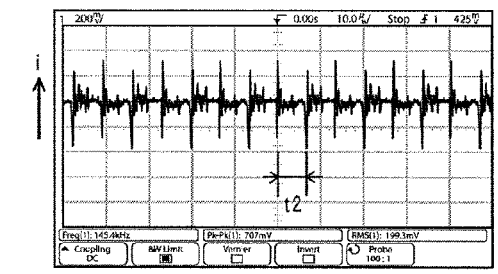
Figure 12:
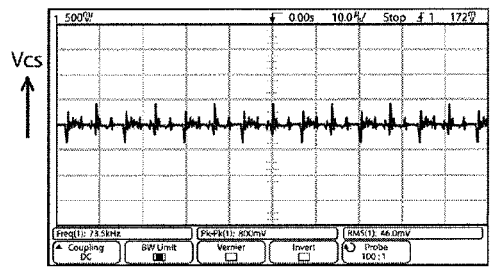
Figure 13:
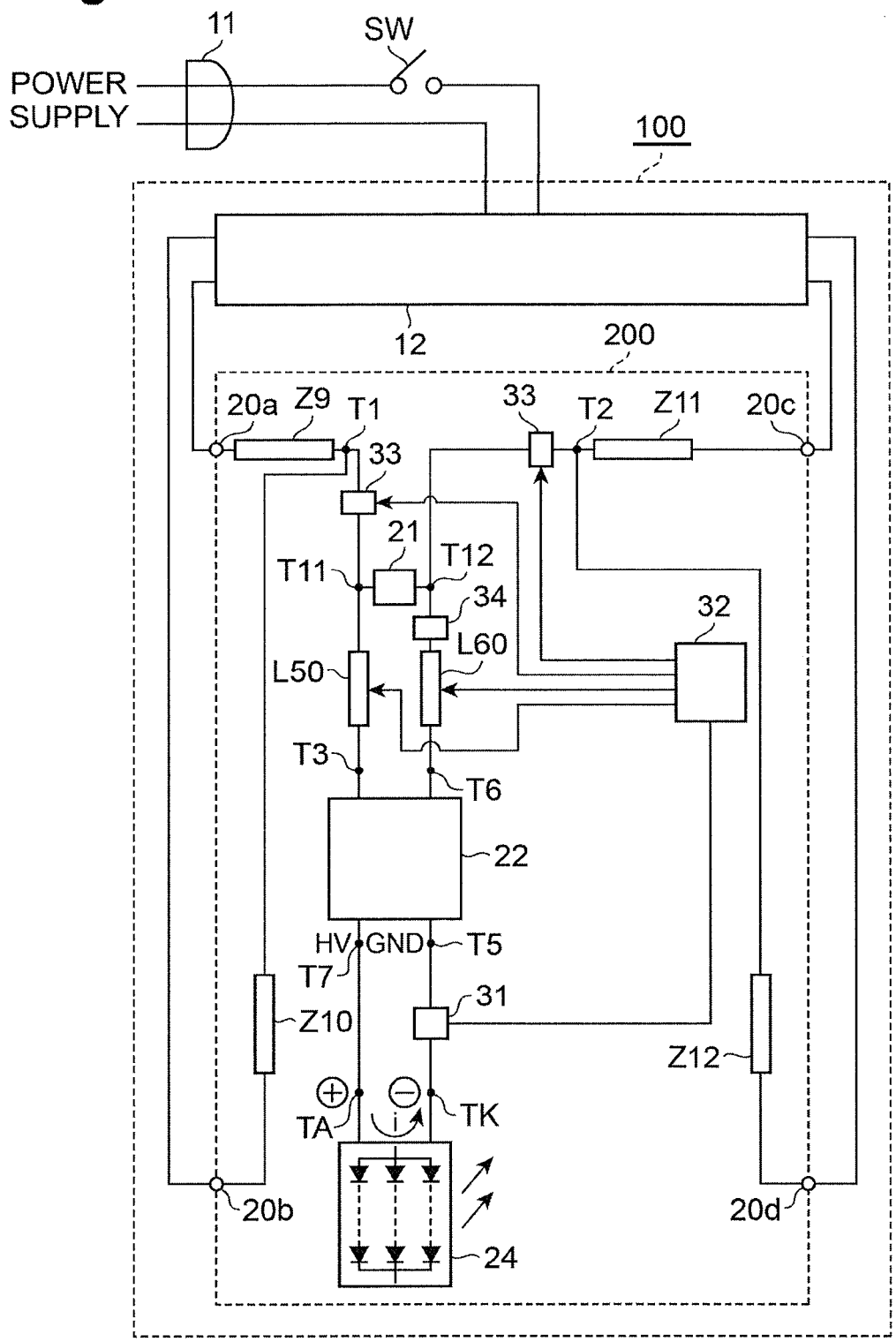
FIG. 13 is a block diagram illustrating the whole circuit of the illumination device in a modified example of the present invention.
Figure 14:
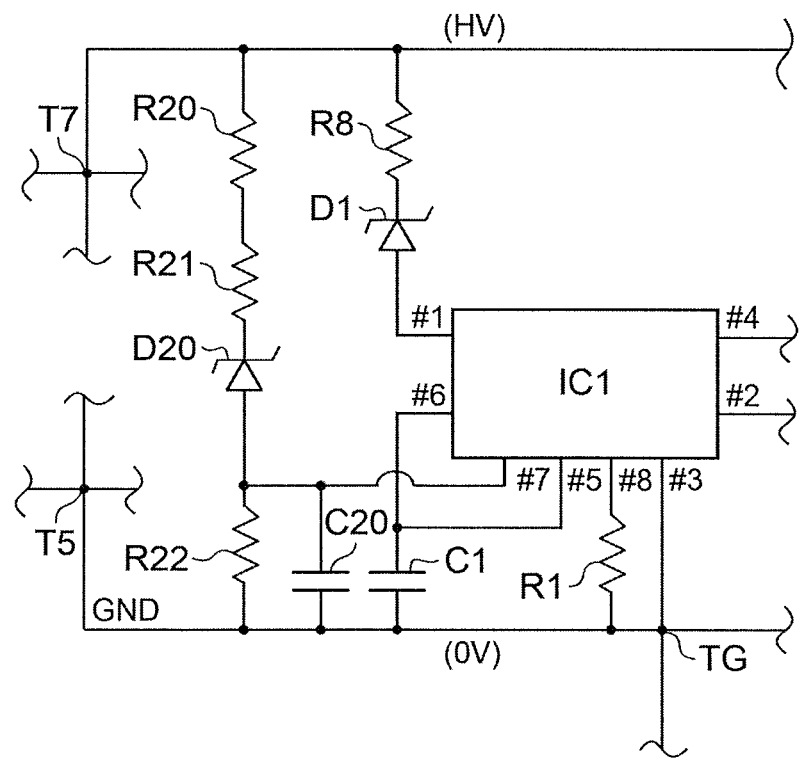
Figure 14:
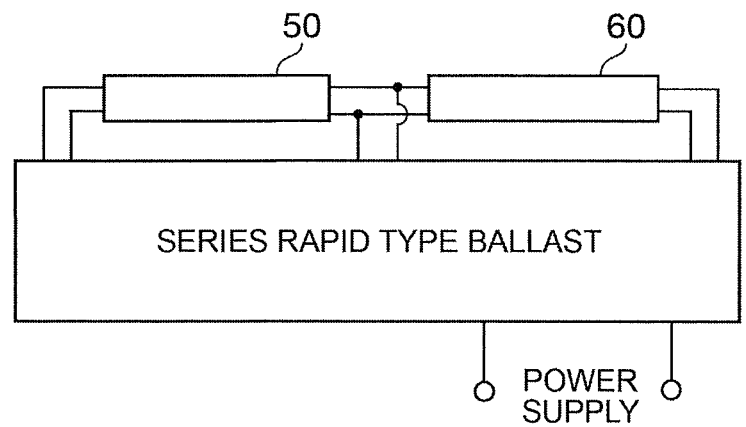
Figure 15:
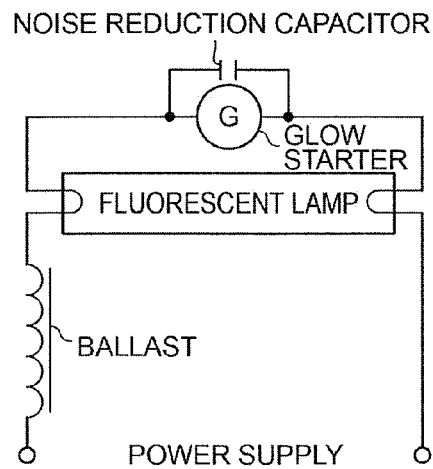
FIGS. 15(a), 15(b) and 15(c) are diagrams illustrating examples of ballasts of glow starter, rapid start and inverter types, respectively.
Figure 15:
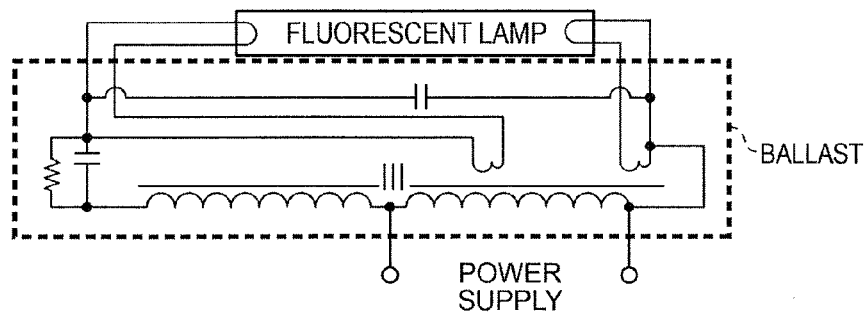
Figure 15:
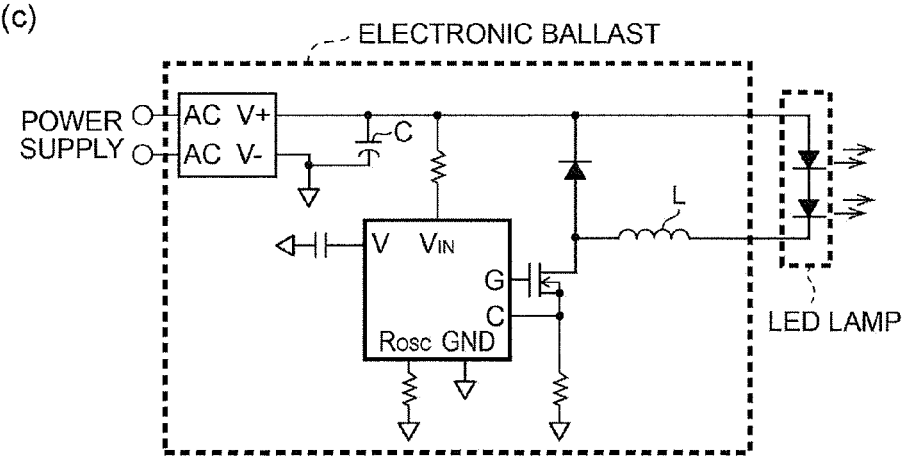
Figure 16:
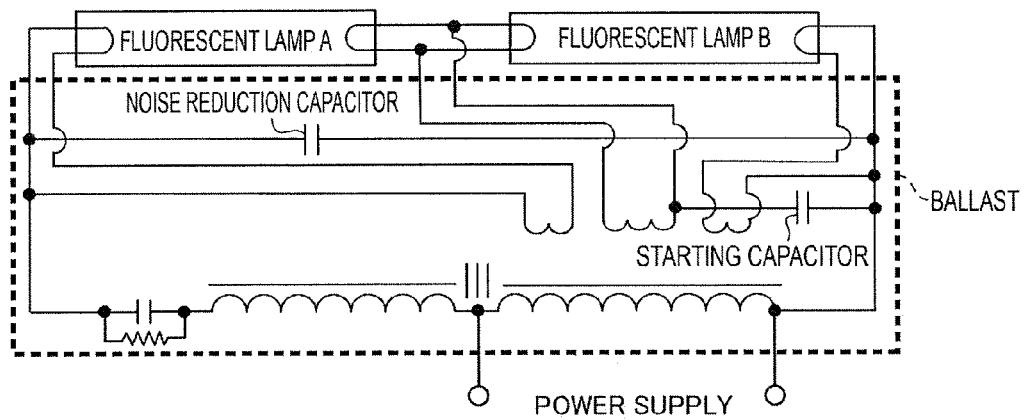
FIG. 16 is a diagram illustrating an example of a series rapid type ballast.

FIG. 1 is a block diagram illustrating the whole circuit of the illumination device according to an embodiment of the present invention; FIG. 2 is a circuit diagram of the LED lamp in the embodiment of the present invention; FIG. 3 is a block diagram illustrating the inside of an integrated circuit IC1; FIGS. 4(a) and 4(b) are circuit diagrams illustrating variable inductance units; FIG. 5 is a chart illustrating variable control patterns of the variable inductance units; FIG. 6 is a diagram illustrating variable regions and circuit interrupt regions of an inductance value with respect to a detected current; FIG. 7 is a flowchart illustrating a current control method of an LED lamp in an embodiment of the present invention; FIGS. 8(a)

to 8(d) and 9(a) to 9(d) are waveforms of input voltages of the LED lamp and currents flowing through an LED unit when the LED lamp is lit by a constant power regulation inverter type ballast in the embodiments of the present invention; FIGS. 10(a) to 10(e) are voltage waveform charts at respective measurement points in a case where a glow starter type is adopted for a ballast of the illumination device in the embodiment of the present invention; FIGS. 11(a) to 11(e) are voltage waveform charts at respective measurement points in a case where a rapid start type is adopted for the ballast of the illumination device in the embodiment of the present invention; FIGS. 12(a) to 12(e) are voltage waveform charts at respective measurement points in a case where an inverter type is adopted for the ballast of the illumination device in the embodiment of the present invention; FIG. 13 is a block diagram illustrating the whole circuit of the illumination device in a modified example of the present invention; and FIG. 14(a) is a diagram illustrating a part of a circuit which makes a threshold voltage variable according to the magnitude of a high voltage (HV), while FIG. 14(b) is an overall block diagram in which LED lamps in an embodiment are connected in series to a series rapid type ballast.

First, as illustrated in FIG. 1, an illumination device 10 according to an embodiment of the present invention includes a plug 11 that is connected in order to supply power from an external power supply of a household AC of 100 to 240 V (50 Hz or 60 Hz), for example, a ballast 12 controlling the power inputted from the plug 11 in order to light a fluorescent lamp, and an LED lamp 20 to which a predetermined voltage is inputted between a pair of input terminal parts (between input terminal parts 20a, 20c) according to the type of the ballast 12.

Here, the ballast 12 may be any known glow starter, rapid start or inverter type for lighting existing fluorescent lamps.

Since the LED lamp 20 operates normally as long as the external power supply has an AC of 100 to 240 V (50 Hz or 60 Hz), the external power may be directly inputted to the LED lamp 20, bypassing the ballast 12.

Here, a line outputting an AC from the ballast 12 is connected so as to enable inputting between either one or both of the pair of input terminal parts (between input terminal parts 20a, 20c) and/or a pair of input terminal parts (between input terminal parts 20b, 20d).

On the other hand, an input circuit unit Z9 constituted by an RC parallel circuit composed of a resistor R9 and a capacitor C9 is connected between the input terminal part 20a of the LED lamp 20 and a terminal T1 (see FIG. 2).

Similarly, an input circuit unit Z10 constituted by an RC parallel circuit composed of a resistor R10 and a capacitor C10 is connected between the input terminal part 20b of the LED lamp 20 and the terminal T1 (see FIG. 2).

Similarly, an input circuit unit Z11 constituted by an RC parallel circuit composed of a resistor R11 and a capacitor C11 is connected between the input terminal part 20c of the LED lamp 20 and a terminal T2 (see FIG. 2).

Similarly, an input circuit unit Z12 constituted by an RC parallel circuit composed of a resistor R12 and a capacitor C12 is connected between the input terminal part 20d of the LED lamp 20 and the terminal T2 (see FIG. 2).

Therefore, a resistance value of about several Ω to about 100Ω is selected for each of the resistors R9, R10 between the input terminal parts 20a, 20b so as to correspond to the resistance component of a filament of the fluorescent lamp.

Similarly, a resistance value of about several Ω to about 100Ω is selected for each of the resistors R11, R12 between the input terminal parts 20c, 20d so as to correspond to the resistance component of the filament of the fluorescent lamp.

When the resistance values of the resistors R9 to R12 are selected as mentioned above, these resistors R9 to R12 can act as dummy resistors even if the ballast 12 is of the inverter type adapted to automatically detect whether or not a fluorescent lamp is mounted on the load side (whether there is conduction through the filament resistance) and outputs no power when the fluorescent lamp is not mounted (case where no fluorescent lamp is mounted), and thus power is normally supplied to the LED lamp 20.

A circuit interrupt unit 33 is connected between the terminals T1, T11, while a circuit interrupt unit 33 is similarly connected between the terminals T2, T12. Each circuit interrupt unit 33 includes a relay of a Form B contact type, for example, and is adapted to interrupt an AC from a pair of input terminal parts when the magnitude of a current i flowing through the LED unit 24 is abnormal. The circuit interrupt unit 33 will be explained later in detail.

Furthermore, a protection circuit unit 21 (see FIG. 2) is inserted between the terminals T11, T12.

In the protection circuit unit 21, a two-electrode discharge tube SA1, within which an inert gas such as neon or argon is enclosed, and a varistor SA2 are connected in series.

Appropriately setting the discharge starting voltage of the two-electrode discharge tube SA1 and the clamping voltage of the varistor SA2 can suppress the surge voltage entering between the terminals T1 and T2 from the power supply side to a peak value of about 400 V or lower. Furthermore, combining the two-electrode discharge tube SA1 and the varistor SA2 in series allows the varistor SA2 to effectively prevent a follow current from being caused by the two-electrode discharge tube SA1 continuously discharging after the surge voltage ends.

This absorbs a surge current, even when a lightning surge or lightning-induced surge, for example, enters from the external input power supply side, and inhibits the surge current from advancing into a rectifier circuit unit 22 side.

Hence, electronic components such as diodes and capacitors constituting the rectifier circuit unit 22 and LED unit 24 can be protected.

A threshold element 34 is connected in series on the terminal T12 side. The threshold element 34 includes two zener diodes D34a, D34b connected in series in directions opposite to each other (bi-directionally) and a relay RY34 connected in parallel to the zener diodes (see FIG. 2), for example. The relay RY34 is driven by an output voltage from a delay circuit (not depicted) which outputs a predetermined voltage after a lapse of a predetermined time from when a current flows through the LED unit 24, so as to short-circuit both ends of the two zener diodes D34a, D34b. The delay circuit is set such as to output a predetermined voltage after the lapse of the predetermined time from when an AC surpasses a predetermined threshold of the threshold element 34 and begins to flow through the rectifier circuit unit 22, thereby driving the relay RY34. As a consequence, after the lapse of the predetermined time from when the AC exceeding the predetermined threshold is inputted to a pair of input terminal parts from the outside, both ends of the threshold element are short-circuited by the relay RY34. The threshold element is defined as an element which starts electrification therewithin when a voltage at a predetermined threshold or higher is applied between both terminals thereof. As the threshold element 34, a SIDAC (registered trademark), which is a gateless two-terminal thyristor, a two-electrode discharge tube and the like are employable in place of the zener diodes D34a, D34b, for example. The threshold element 34 will be explained later in detail.

A variable inductance unit L50 is inserted between the terminal T11 and a terminal T3 on one input side of the rectifier circuit unit 22, and a variable inductance unit L60 is similarly inserted in series with the threshold element 34 between the terminal T12 and a terminal T6 on the other input side of the rectifier circuit unit 22. Inductance values (hereinafter also referred to as L values) of the variable inductance units L50, L60 are controlled by an inductance variable control unit 32. Making inductances variable in the variable inductance units L50, L60 will be explained later in detail.

As a consequence, the variable inductance units L50, L60 act as impedances for restricting flowing currents with respect to high-frequency pulses.

Therefore, when the ballast 12 is of the glow starter or rapid start type, for example, a switching device Q1 switches on/off, and thus prevents switching noises (high-frequency noise pulses) thereof from flowing out to the external AC (input power supply) side through any of the input terminal parts 20a to 20d.

Furthermore, when the ballast 12 is of the inverter type, on the other hand, an AC at a high frequency of 20 kHz to 100 kHz is inputted, and thus the variable inductance units L50, L60 act as (reactive power loss) loads without effective power loss.

This allows power to be stably outputted from the inverter type ballast 12 by ensuring that the load impedance of the LED lamp 20 falls within a predetermined range, in terms of between either one or both of the pair of input terminal parts (between the input terminal parts 20a, 20c) and the pair of input terminal parts (between the input terminal parts 20b, 20d).

Furthermore, the rectifier circuit unit 22 is constituted by a bridge diode composed of four diodes D4 to D7, and electrolytic capacitors C4, C5 connected in parallel so as to smooth a full-wave rectified waveform in the output stage of the bridge diode (see FIG. 2).

In output-side terminals of the rectifier circuit unit 22, a DC voltage is outputted between a high-voltage (HV)-side output terminal T7 and a ground-side output terminal T5.

A high-voltage (HV)-side output terminal T7 is connected to an anode-side terminal TA of the LED unit 24 through a smoothing circuit unit 23, and a cathode-side terminal TK of the LED unit 24 is connected to a PWM control unit 25 through the smoothing circuit unit 23.

Here, the LED unit 24 is constituted by a circuit in which three LED circuit groups, each including 30 LEDs (light-emitting diodes) having a forward voltage of about 3 V each and connected in series, are connected in parallel, and the current i flows in a direction (direction of the arrow) from the anode-side terminal TA to the cathode-side terminal TK.

Additionally, a GND terminal TG of the PWM control unit 25 is connected to the ground-side output terminal T5 on the output side of the rectifier circuit unit 22.

According to the circuit configuration mentioned above, the current i flowing through the LED unit 24 is PWM controlled by the PWM control unit 25 driving pulses at a frequency higher than a predetermined frequency, and falls within a predetermined current value range.

On the other hand, a bypass circuit unit 26 is connected between the cathode-side terminal TK of the LED unit 24 and the ground-side output terminal T5 of the rectifier circuit unit 22.

As a result, in the case where the frequency of the AC inputted to one terminal T3 of the rectifier circuit unit 22 is higher than the predetermined frequency, resistors R3, R4 and R5 are connected in parallel between the terminals T9 and TG even when the switching device Q1 is in the on state (the state where a current flows from the drain terminal to the source terminal; the same hereinafter), and thus the current i, which bypasses (circumvents) the PWM control unit 25 and flows through the LED unit 24, flows directly from the cathode-side terminal TK to the ground-side output terminal T5 of the rectifier circuit unit 22 though the GND terminal TG of the PWM control unit 25.

Hence, the current i hardly flows through the PWM control unit 25, and thus is not PWM controlled.

In the foregoing and following explanations, performing PWM (which is short for Pulse Width Modulation; the same hereinafter) control of the current i according to a duty ratio is defined as a period of a driving pulse that is fixed and controls the current i so as to switch on/off according to the duty ratio (the ratio of pulse width to pulse period, which has the same meaning as "on duty"; the same hereinafter) depending on the magnitude of an input signal (the magnitude of the voltage detected by a pin #2 which is a current sensor terminal in the present embodiment); the duty ratio at that moment is greater than 0% but smaller than 100%.

This can stabilize the magnitude of the current i flowing through the LED unit 24.

On the other hand, not performing PWM control of the current i according to a duty ratio is defined as the PWM control unit not controlling the current i so as to switch on/off according to the duty ratio; in addition to the case where the current i hardly flows through the PWM control unit as mentioned above, this encompasses both a case where the driving pulses have a duty ratio of 0% so that the switching device Q1 is always in the off state during operation, and a case where the driving pulses have a duty ratio of 100% so that the switching device Q1 is always in the on state during operation.

A current detection unit 31 is connected in series with the bypass circuit unit 26 between the cathode-side terminal TK of the LED unit 24 and the ground-side output terminal T5 of the rectifier circuit unit 22. When the bypass circuit unit 26 bypasses the current i flowing through the LED unit 24 (when the ballast is of the inverter type), the current detection unit 31 detects the magnitude of this DC and outputs thus detected signal (DC voltage) to the inductance variable control unit 32.

Then, the inductance variable control unit 32 controls the inductance values of the variable inductance units L50, L60 according to the magnitude of the current detected by the current detection unit 31. The inductance variable control unit 32 will be explained later in detail.

Individual constituent parts will now be explained in further detail with reference to FIGS. 2 to 6.

While the resistor R9 between the input terminal part 20a and terminal T1 acts as a dummy resistor corresponding to the filament of the fluorescent lamp as mentioned above, the capacitor C9 allows an AC to pass therethrough in a normal operation state (when the LED unit 24 is lit).

This can shunt the AC in inverse proportion to the ratio between the capacitive reactance, determined by the frequency of the AC and the capacity of the capacitor C9, and the resistance value of the resistor R9, and thus proportionally suppresses the heat of the resistor R9.

Similarly, while the resistor R11 between the input terminal part 20c and the terminal T2 acts as a dummy resistor corresponding to the filament, the capacitor C11 allows the AC to pass therethrough in the normal operation state, and thus suppress the heat of the resistor R11.

Furthermore, a fuse F1 is used for overcurrent protection against the power supply current inputted between either one or both of the pair of input terminal parts (between input terminal parts 20a, 20c) and the pair of input terminal parts (between input terminal parts 20b, 20d).

Next, the rectifier circuit unit 22 has, in an upstream stage, the bridge diode constituted by the diode D4 whose anode and cathode are connected to the terminal T3 and the high-voltage (HV)-side output terminal T7, respectively, the diode D5 whose anode and cathode are connected to the terminal T6 and the high-voltage (HV)-side output terminal T7, respectively, the diode D6 whose anode and cathode are connected to the terminal T6 and a terminal T4 at the same potential as with the terminal T3, respectively, and the diode D7 whose anode and cathode are connected to the ground-side output terminal T5 and the terminal T6, respectively.

Furthermore, in a stage downstream of the bridge diode, the full-wave rectified waveform is smoothed, and thus the electrolytic capacitors C4, C5 are connected in parallel between the high-voltage (HV)-side output terminal T7 and the ground-side output terminal T5 so as to have plus (+) terminals on the high-voltage (HV)-side output terminal T7 side, and minus (−) terminals on the ground-side output terminal T5 side.

According to this, the smoothed DC-converted output voltage is outputted to the high-voltage (HV)-side output terminal T7, and the lower voltage part is outputted to the ground-side output terminal T5.

The pulsating component (ripple component) of the high DC voltage outputted to the high-voltage (HV)-side output terminal T7 is removed by the smoothing circuit unit 23, and this is called a choke coil input type smoothing circuit and is constituted by a series circuit of choke coils L1 to L4 and a parallel circuit of an electrolytic capacitor C3 with respect to the LED unit 24.

Additionally, the current i, from which the pulsating component has been removed by having passed through the smoothing circuit unit 23, flows from the anode-side terminal TA of the LED unit 24 to the cathode-side terminal TK, and functions to light a total of 90 LEDs (light-emitting diodes) constituting the LED unit 24 mentioned above.

The current i having passed through the smoothing circuit unit 23 from the LED unit 24 is PWM controlled by driving pulses at a predetermined oscillation period $t_{OSC}$ (μs) by the resistors R1 to R8, capacitors C1, C2, a zener diode D1, a diode D2 and the switching device Q1, which constitute the PWM control unit 25 and are connected to the integrated circuit IC1 and pins (#1 to #8).

When a commercially available model HV9910B (see FIG. 3) manufactured by Supertex, Inc. is used as the integrated circuit IC1, the oscillation period $t_{OSC}$ (μs) is controlled by the time obtained according to the following Formula 1 depending on the resistance value $R_T$ (kΩ) of the resistor R1 connected to the pin #8.

$$t_{OSC}(\mu s) = \frac{R_T(k\Omega) + 22}{25} \quad \text{[Formula 1]}$$

When the resistor R1 is set to about 499 (kΩ), for example, in the present embodiment, about 20.84 (μs) is determined as the oscillation period $t_{OSC}$ (μs) according to the above-mentioned Formula 1.

Therefore, if the oscillation period is about 20.84 (μs) as calculated, pulses can be driven at a high frequency of about 48 kHz.

Furthermore, the switching device Q1 controlling the on/off of the current i flowing through the LED unit 24 is an N-channel MOSFET which can control a current flow between drain and source terminals according to the input voltage at a gate terminal.

In the integrated circuit IC1, the drain terminal of the switching device Q1 is connected to the anode terminal of a diode D3 constituting a part of the smoothing circuit unit 23, the source terminal is connected to the terminal T9 connected to the pin #2, which is a current sensor terminal of the integrated circuit IC1, through the resistor R6, and a voltage of a proportion corresponding to that of the resistor R7, where the voltage outputted from the pin #4 of the integrated circuit IC1 has been divided by the resistors R2, R7, is inputted to the gate terminal.

Furthermore, the pin #1 of the integrated circuit IC1 is connected to the high-voltage (HV)-side output terminal T7 through the resistor R8 and zener diode D1, and thus is supplied with the high DC voltage outputted from the rectifier circuit unit 22.

As a consequence, the voltage (about 8 V DC to about 450 V DC) supplied from the pin #1 is lowered, rectified and stabilized by an internal regulator to a predetermined VDD voltage (about 12 V DC), functions as a power supply for driving the inner circuit of the integrated circuit IC1, and the VDD voltage is outputted to the pin #6 (see FIG. 3).

According to such connections as described above, when the voltage detected at the pin #2, which is the current sensor terminal, does not exceed a threshold voltage of about 250 mV DC by driving pulses of the integrated circuit IC1, a high-level voltage (about 7.5 V DC) is outputted to the gate terminal of the switching device Q1, switching it on, whereas when the voltage detected at the pin #2, which is the current sensor terminal, reaches the threshold voltage of about 250 mV DC, a low-level voltage (about 0 V) is outputted to the gate terminal of the switching device Q1, switching it off (a state where no current flows from the drain terminal to the source terminal; the same hereinafter).

In this way, the integrated circuit IC1 acts such that driving pulses outputting the voltage Vg1 at the gate terminal of the switching device Q1 have a fixed period, the duty ratio of the pulse width of the voltage Vg1 at the gate terminal is made variable according to the level of the voltage (current sensor terminal voltage Vcs) detected at the pin #2, and the current i flowing through the LED unit is controlled.

That is, the current i is PWM controlled by the high-frequency driven pulses of the PWM control unit 25, and thus repeatedly increases and decreases in pulses (in triangle waves) at the oscillation period $t_{OSC}$ (μs) obtained by the above-mentioned Formula 1 according to the switching device Q1 that is repeatedly switched on/off.

In the present embodiment, the pin #7 is connected to (has the same potential as) the pin #6, and thus the pin #7 is inputted with the voltage VDD (about 12 V DC) exceeding the above-mentioned threshold voltage (about 250 mV DC).

Furthermore, in the present embodiment, the threshold voltage to be compared with the voltage detected at the pin #2, which is the current sensor terminal, is set to about 250 mV DC generated within the integrated circuit IC1 (see FIG. 3).

On the other hand, when the voltage inputted to the pin #7 in the integrated circuit IC1 is set to a voltage within a range not exceeding about 250 mV DC, this can be set as a threshold voltage to be compared with the voltage detected by the current sensor terminal (pin #2), and thus the duty ratio can further be made variable in a downward direction.

This can lower the effective value (RMS value) of the current i flowing through the LED unit 24, thereby modulating (dimming) light.

Here, when the switching device Q1 is switched off, the series circuit of choke coils L1 to L4 generates a counter-electromotive force in such a direction as to allow the current i to flow, while the diode D3 for absorbing the current caused by the counter-electromotive force is connected in a forward direction from a terminal T8 at a terminal end of the choke coil L1 to the anode-side terminal TA of the LED unit 24.

On the other hand, as mentioned above, the bypass circuit unit 26 and current detection unit 31 are disposed between the cathode-side terminal TK of the LED unit 24 and the ground-side output terminal T5 of the rectifier circuit unit 22.

The bypass circuit unit 26 includes a switching device Q2 and a high-pass filter circuit outputting a drive voltage (gate terminal voltage) to the switching device Q2.

Here, the switching device Q2 of the bypass circuit unit 26 is an N-channel MOSFET which controls a current flow between drain and source terminals according to a voltage inputted to a gate terminal, the drain terminal is connected to the cathode-side terminal TK of the LED unit 24, the source terminal is (electrically) connected to the ground-side output terminal T5 of the rectifier circuit unit 22 through the current detection unit 31, and the gate terminal is connected to the terminal T4 of the rectifier circuit unit 22 through the high-pass filter circuit.

The high-pass filter circuit includes a first capacitor C6, a first resistor R13 connected in series to the first capacitor C6 so as to have one terminal connected to one terminal of the first capacitor, a first diode D9 connected in a forward direction from the other terminal of the first resistor R13 to the gate terminal of the switching device Q2, a second capacitor C7 electrically connected between the source and gate terminals of the switching device Q2, a second resistor R14 electrically connected between the source and gate terminals, a zener diode D10 electrically connected in a forward direction from the source terminal to the gate terminal, and a second diode D8 electrically connected in a forward direction from the source terminal to the other terminal of the first resistor R13.

The other terminal of the first capacitor C6 is connected to any one of the input terminals (the terminal T3 or T6 through the terminal T4) of the rectifier circuit unit 22.

When circuit constants of the first capacitor C6, first resistor R13 and second resistor R14 are selected so as to cut off the AC inputted to the terminal T3 at a predetermined frequency or below, a CR circuit composed of the capacitor and resistors acts as a high-pass filter and thus only allows the AC having a frequency exceeding the predetermined frequency to pass therethrough to a stage downstream thereof.

That is, the AC having a frequency higher than the predetermined frequency inputted to the terminal T3 generates a DC voltage on the high voltage side of the second capacitor C7, second resistor R14 and zener diode D10, and a voltage capable of switching on the switching device Q2 is outputted to the gate terminal.

The voltage at the gate terminal can appropriately be set according to the potential division ratio between the first and second resistors R13, R14, and the zener voltage of the zener diode D10 limiting the voltage inputted to the gate terminal, but may be set so as to fall within a high-level gate terminal voltage range which can switch on the switching device Q2.

The high-pass filter circuit is an input circuit for a filter allowing an AC having a frequency higher than a predetermined frequency to pass therethrough, so as to set the gate terminal of the switching device Q2 to a high level (e.g. about 14 V DC), and thus may be connected to the terminal T6 to which the same AC (except for a 180°-difference in phase) is inputted as with the ground-side terminal T5 of the rectifier circuit unit 22.

According to the foregoing configuration, the high-pass filter outputs a predetermined gate voltage allowing a current to flow from the drain terminal to the source terminal when the AC inputted to the input terminal of the rectifier circuit unit 22 has a frequency higher than a predetermined frequency (in the present embodiment, a cutoff frequency in actual measurement being set to about 5 kHz by choosing a capacity of 100 pF for the first capacitor C6, a resistance value of 51 kΩ for the first resistor R13, and a resistance value of 51 kΩ for the second resistor R14; the same hereinafter), and outputs a gate voltage that does not allow a current to flow from the drain terminal to the source terminal when the AC has a frequency lower than a predetermined frequency.

That is, the switching device Q2 prevents flowing of a current from the cathode-side terminal TK of the LED unit 24 to the ground-side output terminal T5 of the rectifier circuit unit 22 through the GND terminal TG of the PWM control unit 25 when the AC has a frequency lower than the predetermined frequency (about 5 kHz), and makes it possible for a current to flow from the cathode-side terminal TK of the LED unit 24 to the ground-side output terminal T5 of the rectifier circuit unit 22 through the GND terminal TG of the PWM control unit 25 when the AC has a frequency higher than the predetermined frequency (hereinafter referred to as cutoff frequency; about 5 kHz).

As a result, when the external AC inputted to a pair of input terminal parts has a frequency lower than the predetermined frequency (e.g. when inputted from a ballast of the glow starter type or rapid start type), the current i flowing through the LED unit 24 is PWM controlled by the PWM control unit 25 driving pulses at a frequency higher than the predetermined frequency, producing pulse waves (triangle waves).

On the other hand, when the external AC inputted to a pair of input terminal parts has a frequency higher than the predetermined frequency (e.g. when inputted from a ballast of the inverter type), the PWM control unit 25 is bypassed (circumvented) through the bypass circuit unit 26, and thus the current i flowing through the LED unit 24 flows as is to the ground-side output terminal T5 of the rectifier circuit unit 22 without PWM control being performed by the PWM control unit 25.

Therefore, the AC having a high frequency inputted to a pair of input terminal parts only passes through the rectifier circuit 22, smoothing circuit unit 23 and LED unit 24, and thus the current i flowing through the LED unit 24 attains a waveform in which the AC inputted to the pair of input terminal parts is converted to a DC by full-wave rectification (e.g. see FIG. 12(e)).

The current detection unit 31 is constructed by an RC parallel circuit composed of a resistor R31 and a capacitor C31. The current detection unit 31 detects the magnitude of the current flowing from the drain terminal to source terminal of the switching device Q2 in the bypass circuit unit 26 when the switching device Q2 is in the on state. That is, the current detection unit 31 detects the current i flowing through the LED unit 24 when the frequency of the external AC inputted to its pair of input terminal parts is higher than a predetermined frequency, e.g. when the ballast is of the inverter type. In this embodiment, the current detection unit 31 outputs a detected signal (DC voltage) corresponding to the current value flowing therethrough to the inductance variable control unit 32.

The inductance variable control unit 32, which includes a microprocessor, controls the inductance values of the variable inductance units L50, L60 according to the magnitude of the current detected by the current detection unit 31 (i.e. the magnitude of the DC voltage from the current detection unit 31).

For example, as illustrated in FIG. 4(a), the variable inductance unit L50 has inductors L51, L52 connected in series and switch elements 32a, 32b connected in parallel with the respective inductors L51, L52. On the other hand, as illustrated in FIG. 4(b), the variable inductance unit L60 has inductors L51, L52 connected in series and a switch element 32c connected in parallel with the series circuit of the inductors L51, L52. For example, sliding inductors and magnetic amplifiers may be employed for the variable inductance units L50, L60.

By controlling the on/off of the switch elements 32a, 32b, 32c, the inductance variable control unit 32 can make the total inductance value of the variable inductance units L50, L60 variable. When the magnitude of the current i flowing through the LED unit 24 is within a predetermined range (L-value invariable region) as illustrated in FIGS. 5 and 6, for example, the inductance variable control unit 32 switches the switch element 32a on and the switch elements 32b, 32c off as in pattern 2, so as to set the inductance value of the variable inductance units L50, L60 to the total inductance value of the inductors L52, L61, L62.

When the magnitude of the current i flowing through the LED unit 24 is lower than the predetermined range (within an L-value variable (drop) region), on the other hand, all the switch elements 32a to 32c switch on as in pattern 3, so as to lower the total inductance value of the variable inductance units L50, L60. This causes the output voltage to decrease and output current to increase in the constant power regulation inverter type ballast. That is, the current i flowing through the LED unit 24 can be enhanced, so that the magnitude of the current i can be stabilized so as to fall within the predetermined range.

When the magnitude of the current i flowing through the LED unit 24 is higher than the predetermined range (within an L-value variable (rise) region), all the switch elements 32a to 32c switch off as in pattern 1, so as to enhance the total inductance value of the variable inductance units L50, L60. This causes the output voltage to increase and output current to decrease in the constant power regulation inverter type ballast. That is, the current i flowing through the LED unit 24 can be lowered, so that the magnitude of the current i can be stabilized so as to fall within the predetermined range.

On the other hand, when the magnitude of the current detected by the current detection unit 31 exceeds a predetermined upper limit (falls within a circuit interrupt region), the inductance variable control unit 32 controls the circuit interrupt units 33, so as to interrupt the AC flowing from the pair of input terminal parts to the rectifier circuit unit 22 (protection against overcurrent). When the magnitude of the current detected by the current detection unit 31 is below a predetermined lower limit (falls within a circuit interrupt region), the inductance variable control unit 32 controls the circuit interrupt units 33, so as to interrupt the AC flowing from the pair of input terminal parts to the rectifier circuit unit 22 (protection against some abnormalities in the current).

In this embodiment, the current detection unit 31 detects the current after both ends of the threshold element 34 are short-circuited. For example, there are some kinds of constant power control inverter type ballasts which, in order to grasp states of fluorescent lamps (e.g. to check whether or not the fluorescent lamps are attached to the load side) at the time of starting outputs, set the output voltage lower than the rated value beforehand, cause a low slight current to flow that is unable to obtain an appropriate quantity of light, and monitor the magnitude of the output current at that time, subsequently raise the output voltage to a predetermined range, and then perform constant power regulation. In the present embodiment, however, both ends of the threshold element 34 are short-circuited after a lapse of a predetermined time from when inputting the AC exceeding a predetermined threshold to the pair of input terminal parts from the outside, and the inductance value of the variable inductance unit is made variable according to the magnitude of the DC flowing through the LED unit after both ends of the threshold element 34 are short-circuited, so that, even in such kinds of inverter type ballasts, only the current flowing through the LED unit to be detected (the current in a normal lighting state) is detected without performing erroneous control.

A current control method of an LED lamp in the case where the ballast is of a constant power regulation inverter type will now be explained with reference to FIG. 7.

First, the inductance variable control unit 32 sets the inductance values of the variable inductance units L50, L60 to pattern 2 as an initial setting (step S01).

Subsequently, after a lapse of a predetermined time from when inputting an AC exceeding a predetermined threshold from the ballast of the constant power regulation inverter type to the pair of input terminal parts, both ends of the threshold element 34 are short-circuited, whereby the AC enabling normal lighting flows through the variable inductance units L50, L60 and rectifier circuit 22. Since the ballast is of the inverter type, while the frequency of the AC is higher than a predetermined frequency, the switching device Q2 in the bypass circuit unit 26 switches on, so that the LED unit 24 is supplied with the current rectified by the rectifier circuit unit 22 after flowing thereto through the variable inductance units L50, L60 (step S02). Here, the current i flowing through the LED unit 24 is neither PWM controlled by the PWM control unit 25 nor smoothed by the smoothing circuit unit 23 (both units are bypassed).

Next, the current detection unit 31 detects the magnitude of the current i flowing through the LED unit 24 (step S03). When the magnitude of the current detected by the current detection unit 31 is within a predetermined range (the L-value invariable region illustrated in FIG. 6), the inductance variable control unit 32 keeps the inductance values of the variable inductance units L50, L60 unchanged in pattern 2 (step S04).

When the magnitude of the current detected by the current detection unit 31 is lower than the predetermined range (within the L-value variable (drop) region illustrated in FIG. 6), however, the inductance variable control unit 32 sets the inductance values of the variable inductance units L50, L60 to pattern 3, so as to lower the total inductance value. This causes the output voltage to decrease and the output current to increase in the ballast of the constant power regulation inverter type. That is, the current i flowing through the LED unit 24 can be enhanced, whereby the magnitude of the current i flowing through the LED unit 24 can be stabilized so as to fall within the predetermined range (step S04).

When the magnitude of the current detected by the current detection unit 31 is higher than the predetermined range (within the L-value variable (rise) region illustrated in FIG. 6), on the other hand, the inductance variable control unit 32 sets the inductance values of the variable inductance units L50, L60 to pattern 1, so as to enhance the total inductance value. This causes the output voltage to increase and the output current to decrease in the ballast of the constant power regulation inverter type. That is, the current i flowing through the LED unit 24 can be lowered, whereby the magnitude of the current i flowing through the LED unit 24 can be stabilized so as to fall within the predetermined range (step S04).

When the magnitude of the current detected by the current detection unit 31 is higher than the predetermined upper limit (within the circuit interrupt region illustrated in FIG. 6), the inductance variable control unit 32 controls the circuit interrupt unit 33, so as to interrupt the AC flowing from the pair of input terminal parts to the rectifier circuit unit 22 (protection against overcurrent). When the magnitude of the current detected by the current detection unit 31 is lower than the predetermined lower limit (within the circuit interrupt region illustrated in FIG. 6), the inductance variable control unit 32 controls the circuit interrupt unit 33, so as to interrupt the AC flowing from the pair of input terminal parts to the rectifier circuit unit 22 (protection against some abnormalities in the current).

Waveforms of the input voltage Vin and the current i flowing through the LED unit 24 observed when the LED lamp 20 is lit by the ballast 12 of the constant power regulation inverter type while the inductance values of the variable inductance units L50, L60 are changed according to the magnitude of the current i flowing through the LED unit 24 will now be explained with reference to FIGS. 8 and 9.

Figure 8:
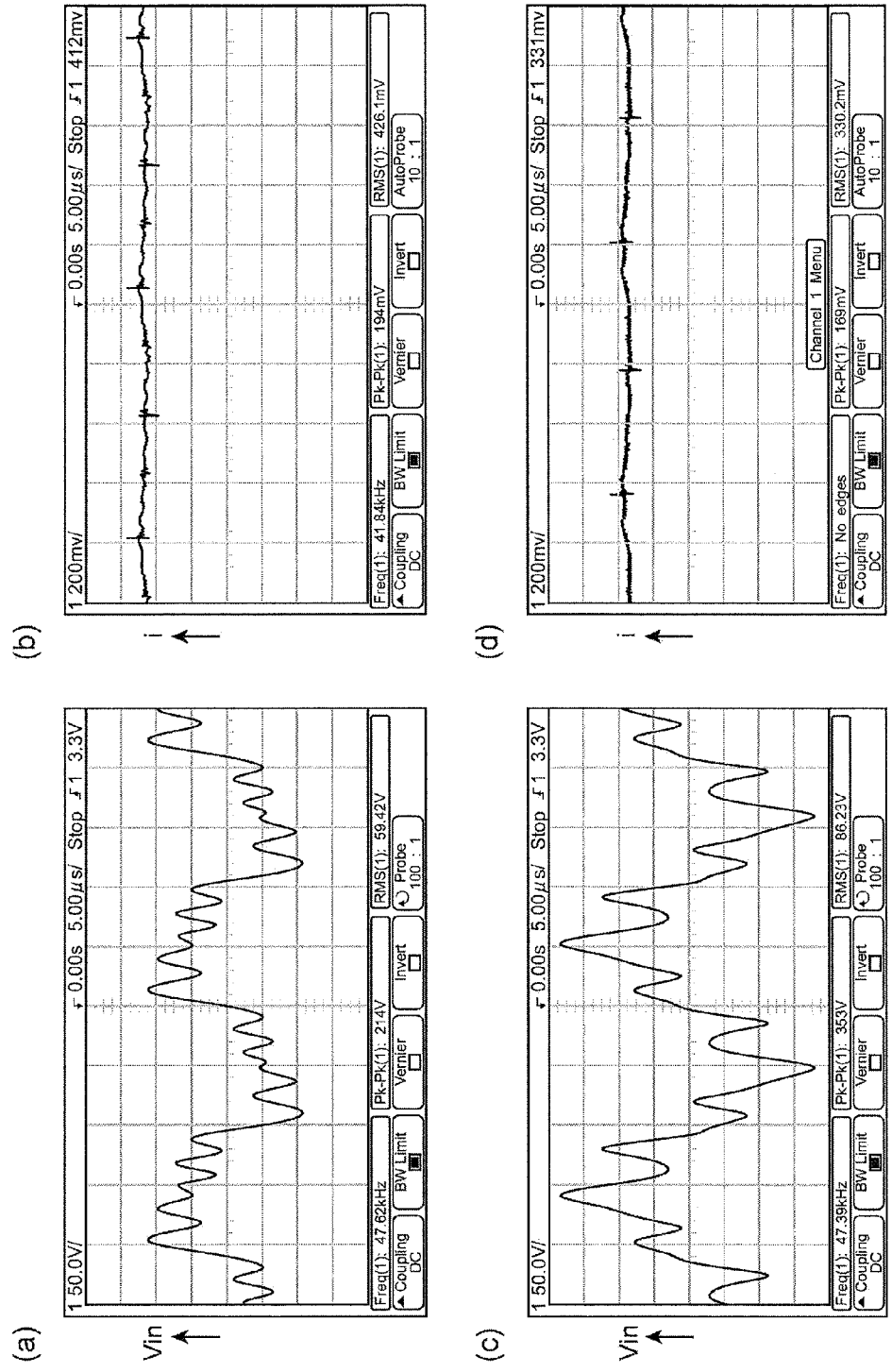
FIGS. 8(a) and 8(b), respectively, are waveforms of an input voltage and a current flowing through an LED unit at an inductance value of 100 μH when the LED lamp is lit by a constant power regulation inverter type ballast, while FIGS. 8(c) and 8(d), respectively, are waveforms of the input voltage and the current flowing through the LED unit at an inductance value of 400 μH when the LED lamp is lit by the constant power regulation inverter type ballast.
Figure 9:
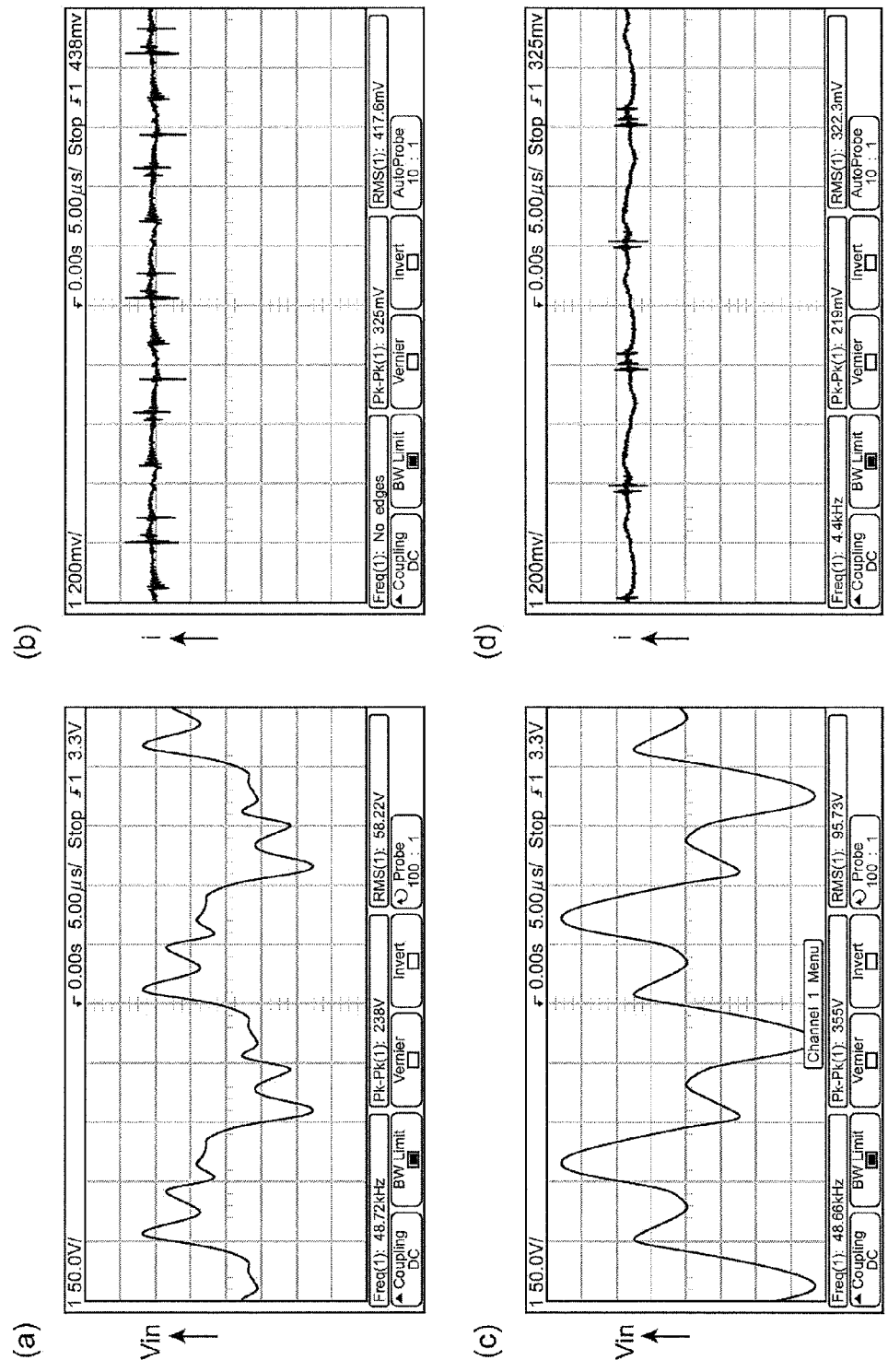
FIGS. 9(a) and 9(b), respectively, are waveforms of an input voltage and a current flowing through an LED unit at an inductance value of 100 μH when the LED lamp is lit by a constant power regulation inverter type ballast, while FIGS. 9(c) and 9(d), respectively, are waveforms of an input voltage and a current flowing through an LED unit at an inductance value of 400 μH when the LED lamp is lit by the constant power regulation inverter type ballast.

In FIGS. 8 and 9, similar observations are performed with different kinds of ballasts of the constant power regulation inverter type. FIGS. 8(a) and 9(a) observe the input voltage Vin of the LED lamp 20 when the total inductance value of the variable inductance units L50, L60 is 100 µH, while their ordinates correspond to 50 V/div. FIGS. 8(b) and 9(b) observe the current i flowing through the LED unit 24 when the total inductance value of the variable inductance units L50, L60 is 100 µH, while their ordinates correspond to 200 mA/div. FIGS. 8(c) and 9(c) observe the input voltage Vin of the LED lamp 20 when the total inductance value of the variable inductance units L50, L60 is 400 µH, while their ordinates correspond to 50 V/div. FIGS. 8(d) and 9(d) observe the current i flowing through the LED unit 24 when the total inductance value of the variable inductance units L50, L60 is 400 µH, while their ordinates correspond to 200 mA/div.

The resistance value of the resistor R31 in the current detection unit 31 is 1Ω. When the voltage at their both ends is 390 mV, i.e. when the current flowing through the LED unit 24 is 390 mA, it is taken as a threshold. When the threshold is exceeded, the total inductance value of the variable inductance units L50, L60 is switched from 100 µH (pattern 2) to 400 µH (pattern 1).

According to FIGS. 8 and 9, it was observed that dramatically changing the total inductance value of the variable inductance units L50, L60 from 100 µH to 400 µH increased the output voltage of the inverter type ballast, and the output current was controlled so as to decrease and stabilized within the predetermined range (L-value invariable region) at 390 mA or less.

Figure 10:
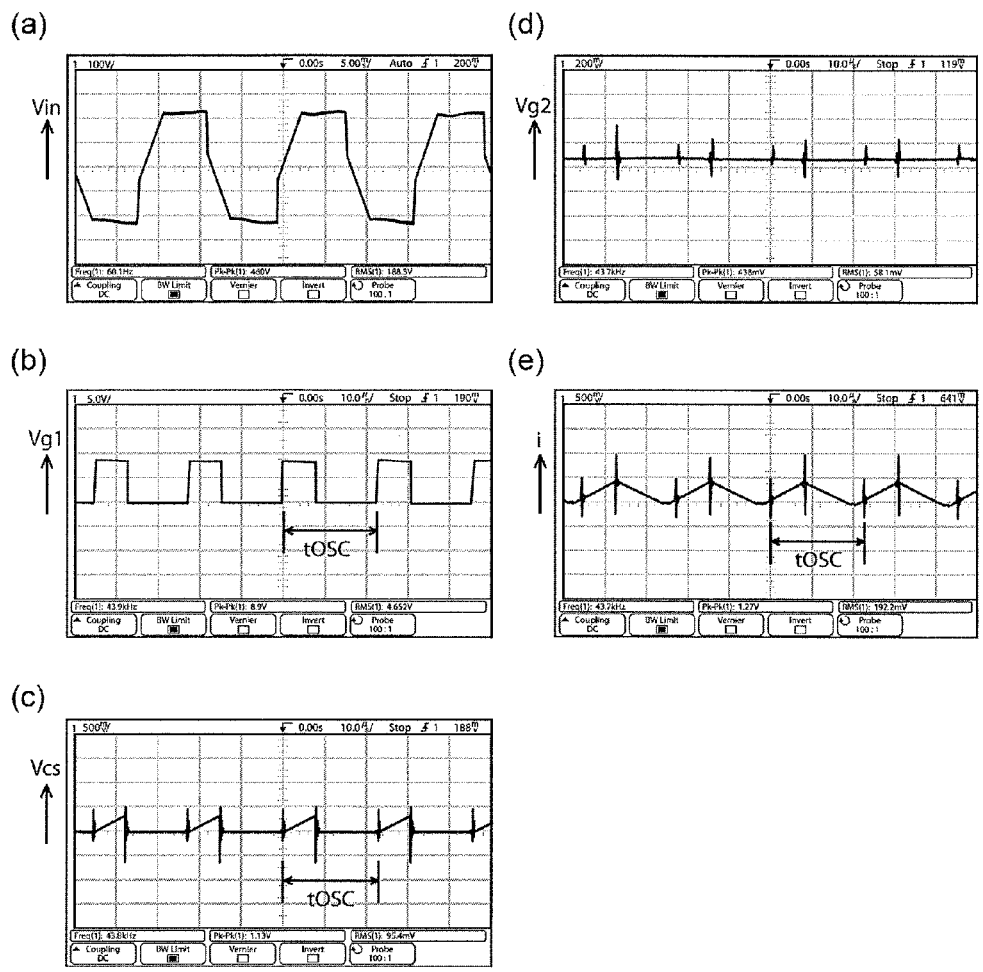
FIGS. 10(a), 10(b), 10(c), 10(d) and 10(e), respectively, are waveforms of an input voltage Vin, a voltage Vg1 at a gate terminal of a switching device Q1, a current sensor terminal voltage Vcs of an integrated circuit IC1, a voltage Vg2 at a gate terminal of a switching device Q2, and a current i flowing through an LED unit 24.
Figure 11:
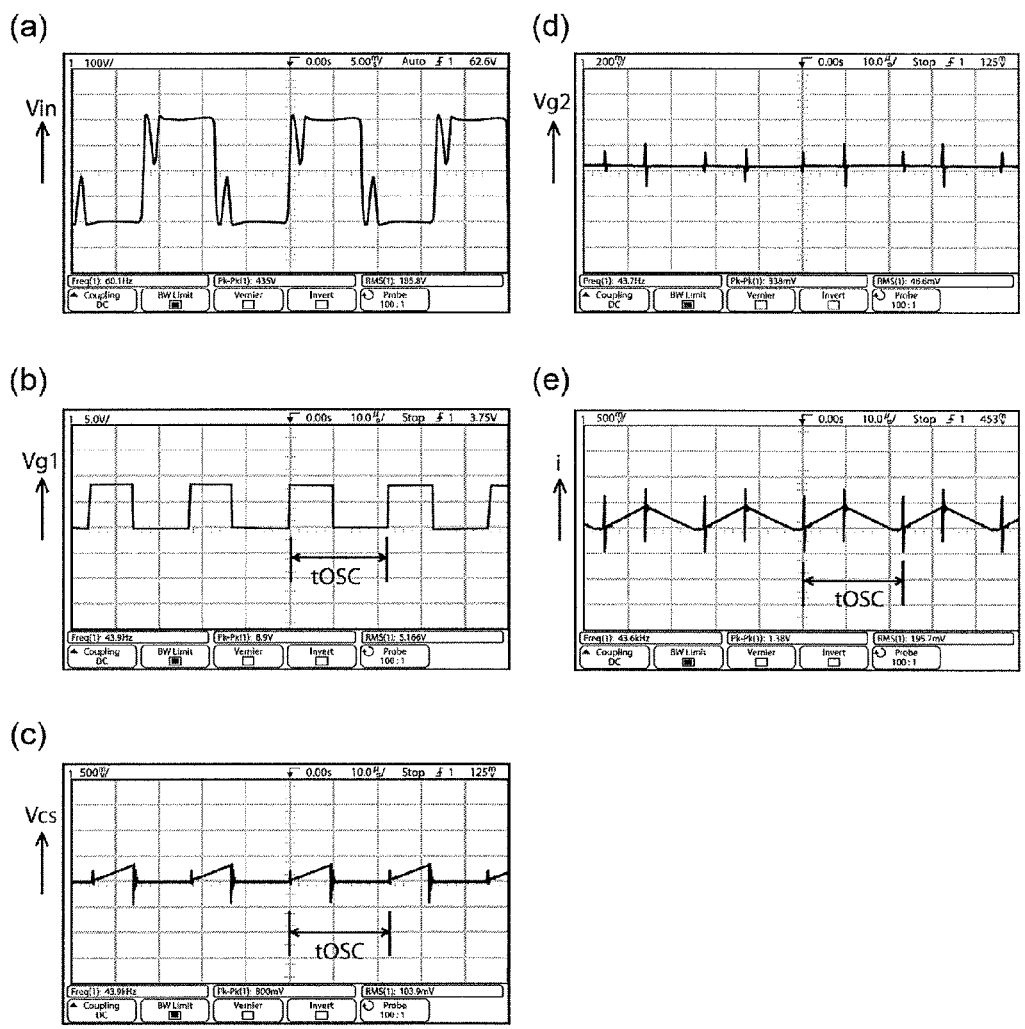
FIGS. 11(a), 11(b), 11(c), 11(d) and 11(e), respectively, are waveforms of the input voltage Vin, the voltage Vg1 at the gate terminal of the switching device Q1, the current sensor terminal voltage Vcs of the integrated circuit IC1, the voltage Vg2 at the gate terminal of the switching device Q2, and the current i flowing through the LED unit 24.

Observed waveforms of the input voltage Vin at the pair of input terminal parts (between the input terminal parts 20a, 20c), voltage Vg1 at the gate terminal of the switching device Q1, current sensor terminal voltage Vcs at the pin #2 of the integrated circuit IC1, voltage Vg2 at the gate terminal of the switching device Q2 and current i flowing through the LED unit 24 will now be explained according to types of the ballast 12, with reference to FIGS. 10 to 12.

Here, each of the gate terminal voltages Vg1, Vg2 and current sensor terminal voltage Vcs are measured while taking the GND terminal TG of the PWM control unit 25 as a reference (ground level).

The current i flowing through the LED unit 24 illustrated in FIGS. 10(e), 11(e) and 12(e) is observed as a voltage drop on an inserted resistance (1Ω) when a total current flowing through the LED unit 24 (a total of 90 LEDs) is inputted to the resistance; the ordinate in each of FIGS. 10(e) and 11(e) corresponds to 500 mA/div, and the ordinate in FIG. 12(e) corresponds to 200 mA/div.

FIGS. 10(a), 10(b), 10(c), 10(d) and 10(e), respectively, illustrate waveforms of the input voltage Vin, voltage Vg1 at the gate terminal of the switching device Q1, current sensor terminal voltage Vcs of the integrated circuit IC1, voltage Vg2 at the gate terminal of the switching device Q2 and current i flowing through the LED unit 24, when the ballast 12 used is of the glow starter type (with a secondary voltage of 200 V and a secondary current of 0.42 A).

First, as illustrated in FIG. 10(a), a utility power frequency of 60.1 Hz is observed as a waveform frequency of the input voltage Vin.

Since this frequency is lower than the cutoff frequency set to about 5 kHz, the integrated circuit IC1 of the PWM control unit 25 drives pulses so as to output the voltage Vg1 at the gate terminal of the switching device Q1 whose oscillation period $t_{OSC}$ (µs) is about 22.78 (µs) in actual measurement as illustrated in FIG. 10(b).

Here, the switching device Q1 is pulse-driven at a frequency of about 43.9 kHz by alternately inputting the gate terminal with voltages at a high level (about 7.5 V DC) and a low level (about 0 V) with a duty ratio of about 33%.

As illustrated in FIG. 10(c), this is due to a PWM control action of the integrated circuit IC1, which outputs voltages at the high level (about 7.5 V DC) to the gate terminal of the switching device Q1 until the current sensor terminal voltage Vcs reaches about 250 mV DC, and outputs voltages at the low level (about 0 V) to the gate terminal of the switching device Q1 after the current sensor terminal voltage Vcs reaches about 250 mV DC.

When the voltage at the high level (about 7.5 V DC) is inputted to the gate terminal of the switching device Q1, switching it on, a current flows through the resistors R3 to R5, thereby linearly raising the current i flowing through the LED unit 24; when the voltage at the low level (about 0 V) is inputted to the gate terminal of the switching device Q1, the switching device Q1 switches off, and thus the current sensor terminal voltage Vcs drops to the ground level (0 V).

On the other hand, since the frequency of the waveform of the input voltage Vin is lower than the cutoff frequency that was set to about 5 kHz, only a voltage of about 50 mV DC is inputted to the gate terminal of the switching device Q2 through the above-mentioned high-pass filter circuit as illustrated in FIG. 10(d), switching off the switching device Q2, and thus a current does not flow from the drain terminal to the source terminal.

Hence, as illustrated in FIG. 10(e), the current i flowing through the LED unit 24 flows in synchronization with the voltage Vg1 at the gate terminal of the switching device Q1, rises when the switching device Q1 is switched on, and begins to fall when the switching device Q1 is switched off (the counter-electromotive force caused by the choke coils L1 to L4 keeps the current i from immediately dropping to 0 A).

That is, the current i flowing through the LED unit 24 is PWM controlled by the PWM control unit 25 driving pulses at a frequency of about 43.9 kHz, as illustrated in FIG. 10(b).

As a result, as illustrated in FIG. 10(e), the current i flowing through the LED unit 24 is outputted as pulses (triangle waves) at a frequency of 43.7 kHz, which is higher than the cutoff frequency of 5 kHz in the frequency measurement, and was observed as about 192.2 mA in effective value (RMS value) measurement.

FIGS. 11(a), 11(b), 11(c), 11(d) and 11(e), respectively, illustrate waveforms of the input voltage Vin, voltage Vg1 at the gate terminal of the switching device Q1, current sensor terminal voltage Vcs of the integrated circuit IC1, voltage Vg2 at the gate terminal of the switching device Q2 and current i flowing through the LED unit 24, when the ballast 12 used is of the rapid start type (with a secondary voltage of 190 V and a secondary current of 0.42 A).

First, as illustrated in FIG. 11(a), a frequency of 60.1 Hz is observed as a waveform frequency of the input voltage Vin.

Since this frequency is lower than the cutoff frequency that was set to about 5 kHz, the integrated circuit IC1 of the PWM control unit 25 drives pulses so as to output the voltage Vg1 at the gate terminal of the switching device Q1 whose oscillation period $t_{OSC}$ (µs) is about 22.78 (µs) in actual measurement, as illustrated in FIG. 11(b).

Here, the switching device Q1 is pulse-driven at a frequency of about 43.9 kHz by alternately inputting voltages at a high level (about 7.5 V DC) and a low level (about 0 V) with a duty ratio of about 43% to the gate terminal.

As illustrated in FIG. 11(c), this is due to a PWM control action of the integrated circuit IC1, which outputs voltages at the high level (about 7.5 V DC) to the gate terminal of the switching device Q1 until the current sensor terminal voltage Vcs reaches about 250 mV DC, and outputs voltages at the low level (about 0 V) to the gate terminal of the switching device Q1 after the current sensor terminal voltage Vcs reaches about 250 mV DC.

When the voltage at the high level (about 7.5 V DC) is inputted to the gate terminal of the switching device Q1, switching it on, a current flows through the resistors R3 to R5, thereby linearly raising the current i flowing through the LED unit 24; when the voltage at the low level (about 0 V) is inputted to the gate terminal of the switching device Q1, the switching device Q1 switches off, and thus the current sensor terminal voltage Vcs drops to the ground level (0 V).

On the other hand, since the frequency of the waveform of the input voltage Vin is lower than the cutoff frequency that was set to about 5 kHz, only a voltage of about 50 mV DC is inputted to the gate terminal of the switching device Q2 through the above-mentioned high-pass filter circuit as illustrated in FIG. 11(d), switching off the switching device Q2, and thus a current does not flow from the drain terminal to the source terminal.

Hence, as illustrated in FIG. 11(e), the current i flowing through the LED unit 24 flows in synchronization with the voltage Vg1 at the gate terminal of the switching device Q1, rises when the switching device Q1 is switched on, and begins to fall when the switching device Q1 is switched off (the counter-electromotive force caused by the choke coils L1 to L4 keeps the current i from immediately dropping to 0 A).

That is, the current i flowing through the LED unit 24 is PWM controlled by the PWM control unit 25 driving pulses at a frequency of about 43.9 kHz, as illustrated in FIG. 11(b).

Consequently, as illustrated in FIG. 11(e), the current i flowing through the LED unit 24 is outputted as pulses (triangle waves) at a frequency of 43.6 kHz, which is higher than the cutoff frequency of 5 kHz in the frequency measurement, and was observed as about 195.7 mA in effective value (RMS value) measurement.

FIGS. 12(a), 12(b), 12(c), 12(d) and 12(e), respectively, illustrate waveforms of the input voltage Vin, voltage Vg1 at the gate terminal of the switching device Q1, current sensor terminal voltage Vcs of the integrated circuit IC1, voltage Vg2 at the gate terminal of the switching device Q2 and current i flowing through the LED unit 24, when the ballast 12 used is of the inverter type (with a secondary voltage of 280 V and a secondary current of 0.225 A under no load).

First, as illustrated in FIG. 12(a), in the waveform of the input voltage Vin, the period t1 is about 13.7 (µs), and a frequency of 73.0 kHz is observed.

Since this frequency is higher than the cutoff frequency that was set to about 5 kHz, the gate terminal of the switching device Q2 is inputted with the voltage Vg2 at a high level (about 14 V DC) as illustrated in FIG. 12(d), and thus the switching device Q2 is always in the on state.

However, the resistors R3, R4, R5 are connected in parallel between the terminals T9, TG as mentioned above, and thus the current i having flowed through the LED unit 24 hardly flows through the PWM control unit 25, and flows directly from the cathode-side terminal TK of the LED unit 24 to the ground-side output terminal T5 of the rectifier circuit unit 22 through the GND terminal TG of the PWM control unit 25.

As a result, the current i does not flow through the resistors R3 to R5, and thus the current sensor terminal voltage Vcs is stable at the ground level (0 V) as illustrated in FIG. 12(c), the duty ratio of the driving pulses becomes 100% as illustrated in FIG. 12(b), the voltage Vg1 at the gate terminal of the switching device Q1 in the PWM control unit 25 is always at the high level (about 7.5 V DC), and the switching device Q1 is in the on state.

Hence, the PWM control unit 25 does not perform PWM control of the current i flowing through the LED unit 24.

As illustrated in FIG. 12(e), the current i flowing through the LED unit 24 attains a waveform in which the input voltage Vin is full-wave rectified without PWM control by the PWM control unit 25, and was observed as about 199.3 mA in effective value (RMS value) measurement.

Furthermore, without the PWM control by the driving pulses of the PWM control unit 25, the period t2 of the ripple voltage waveform part superposed on the DC becomes about 6.9 (µs), and the frequency of the current i flowing through the LED unit 24 was observed as about 145.4 kHz, which is twice as high as that of the input voltage Vin.

Therefore, it could be confirmed that the frequency of the ripple voltage waveform part of the current i flowing through the LED unit 24 becomes twice as high as that of the input voltage Vin through full-wave rectification.

From the foregoing observations, it was confirmed that 190 mA to 200 mA can be obtained in actual measurement as an effective value (RMS value) of the current i flowing through the LED unit 24, and the latter can be lit for illumination, regardless of whether the ballast 12 of the illumination device 10 is of the glow starter, rapid start or inverter lighting type.

It was also confirmed that, when the ballast 12 is of the glow starter or rapid start type, the current i flowing through the LED unit 24 is PWM controlled by the PWM control unit 25 driving pulses at a frequency of about 43.6 to 43.7 kHz, which is higher than the cutoff frequency of 5 kHz, since the frequency of the input voltage Vin is about 60 Hz.

When the ballast 12 is of the inverter type, on the other hand, it was confirmed that the frequency of the input voltage Vin is about 73.0 kHz, which is higher than the cutoff frequency of 5 kHz, and thus the current i flowing through the LED unit 24 is about 145.4 kHz and is not PWM controlled by the PWM control unit 25 driving pulses.

The technical scope of the present invention is not limited to any of the embodiments mentioned above but may be modified in various ways within the scope set forth in the claims, and includes modified examples of the embodiments which can be obtained by appropriately combining technical means respectively disclosed in different embodiments.

For example, the present embodiment exemplified a mode including the PWM control unit 25, the smoothing circuit unit 23 and the bypass circuit unit 26, so as to enable lighting for illumination which can be lit under PWM control by driving pulses by replacing a previously mounted fluorescent lamp (or LED lamp), regardless of whether a ballast of a fluorescent lamp lighting device is of the glow starter, rapid start or inverter lighting type. However, as illustrated in FIG. 13, which is one of modified examples, the LED lamp 200 may be a mode that does not include the PWM control unit 25, the smoothing circuit unit 23 and the bypass circuit unit 26 illustrated in FIG. 1. In FIG. 13, constituent elements having the same functions as those illustrated in FIG. 1 are referred to with the same signs.

Here, since the LED lamp 200 is a mode that does not include the PWM control unit 25, the smoothing circuit unit 23 and the bypass circuit unit 26, it is unable to perform PWM control by driving pulses according to the frequency of the AC inputted to the pair of input terminal parts, and thereby cannot perform PWM control by driving pulses at a high frequency when mounted to a ballast of the glow starter or rapid start type, but can stabilize the magnitude of the current i flowing through the LED unit 24 to fall within a predetermined range as mentioned above when mounted to the ballast of the inverter type.

Furthermore, a pair of input terminal parts is meant to include at least one pair of input terminal parts; when there are four input terminal parts (two on each side), i.e. as in terminals on both end parts of a straight tube fluorescent lamp, it would be sufficient for an external AC to be inputted to at least two of the input terminal parts (two terminals from one side or both sides).

When two terminals are connected to each other simply with a lead through another terminal, the above-mentioned description of embodiments assumes that the two terminals are directly connected to each other (at the same potential), and ignores the wiring resistance and the like.

Furthermore, the predetermined frequency distinguishing the frequency of the AC inputted to the pair of input terminal parts is preferably about 5 kHz (cutoff frequency) which can distinguish between a utility power frequency (50 Hz or 60 Hz) in the case of the glow starter or rapid start type ballast, and a high frequency (about 20 kHz to 100 kHz) in the case of the inverter type, but may appropriately be set so as to become a desirable frequency within the frequency range of higher than 65 Hz but lower than 20 kHz by changing circuit constants in the high-pass filter circuit.

Similarly, the frequency and duty ratio of pulses driven by the PWM control unit may be set by appropriately configuring resistors connected to pins, drive voltage and the like within the spec range of the integrated circuit IC1 in view of the current flowing through the LED unit (illuminance), the heat of the switching device in the PWM control unit, and the like.

In particular, circuit configurations and circuit constants in the circuit diagrams used for reference may appropriately be selected within a range included in the technical scope of the present invention as long as they achieve the intended objective of the present invention and yield desired effects, even when not clearly specified in the above-mentioned description of embodiments.

With reference to FIGS. 14(a) and 14(b), a case where LED lamps 50, 60, each having the same configuration as with the LED lamp 20, are connected in series, mounted to a series rapid type ballast and lit will be explained.

First, as illustrated in FIG. 14(a), connecting a plurality of resistors R20, R21, a zener diode D20 and a resistor R22 in series between the high-voltage (HV)-side output terminal T7 and the ground-side output terminal T5, and inputting a DC voltage (a voltage which is lower than about 250 mV DC and proportional to the magnitude of the high voltage (HV)), which has been divided at the resistor R22, to the pin #7 of the integrated circuit IC1, enables the threshold voltage to be made variable in proportion to the magnitude of the voltage inputted to the pair of input terminal parts.

For example, selecting 1 MΩ as the resistance value of the resistor R20, 1 MΩ as the resistance value of the resistor R21, 51 V as the zener voltage of the zener diode D20, 3.65 kΩ as the resistance value of the resistor R22 and 1 μF as the capacitance of the capacitor C20 inputs about 215 mV in actual measurement to the pin #7 of the integrated circuit IC1 when 165 V is outputted through the high-voltage (HV)-side output terminal T7.

In this way, the voltage inputted to the pair of input terminal parts, and the current flowing through the LED unit that is PWM controlled, increase and decrease in proportion to each other, and thus the input impedance of the whole LED lamp in terms of the pair of input terminal parts is made positive (the flowing current increases proportionally as the input voltage becomes higher).

Hence, even when the LED lamps 50, 60 having the same configuration as with the LED lamp 20 according to the embodiment are connected in series in a series rapid type ballast as illustrated in FIG. 14(b), the voltage inputted from the series rapid type ballast is proportionally distributed according to their respective input impedances, thus facilitating the flow of the same drive current through both, and also enabling the LED lamps in the present embodiment to be connected in series.

INDUSTRIAL APPLICABILITY

As in the foregoing, the LED lamp, illumination device including the LED lamp and current control method of the LED lamp of the present invention can be applied for use as an LED lamp, an illumination device including the LED lamp and a current control method of an LED lamp, capable of stabilizing the magnitude of the current flowing through an LED unit within a predetermined range, by replacing a previously mounted fluorescent lamp (or LED lamp), regardless of whether a ballast of a fluorescent lamp lighting device is of the glow starter, rapid start or inverter lighting type.

REFERENCE SIGNS LIST 10, 100 illumination device
11 plug
12 ballast
20, 50, 60, 200 LED lamp
20a, 20b, 20c, 20d input terminal part
21 protection circuit unit
22 rectifier circuit unit
23 smoothing circuit unit
24 LED unit
25 PWM control unit
26 bypass circuit unit
31 current detection unit
R31 resistor
C31 capacitor
32 inductance variable control unit
33 circuit interrupt unit
34 threshold element
D34a, D34b zener diode
RY34 relay
L50, L60 variable inductance unit
L51, L52, L61, L62 inductor
32a, 32b, 32c switch element
C1, C2, C9, C10, C11, C12, C20 capacitor
C3, C4, C5 electrolytic capacitor
C6 first capacitor
C7 second capacitor
D2, D3, D4, D5, D6, D7 diode D8 second diode
D9 first diode
D1, D10, D20 zener diode
Z9, Z10, Z11, Z12 input circuit unit
HV high voltage
F1 fuse
IC1 integrated circuit
L1, L2, L3, L4 choke coil
Q1, Q2 switching device
R1, R2, R3, R4, R5, R6, R7, R8, R9, R10, R11, R12, R20, R21, R22 resistor
R13 first resistor
R14 second resistor
$R_T$ resistance value
SA1 two-electrode discharge tube
SA2 varistor
S01, S02, S03, S04 step
T1, T2, T3, T4, T6, T8, T9, T11, T12 terminal
T5 ground-side output terminal
T7 high-voltage (HV)-side output terminal
TA anode-side terminal
TK cathode-side terminal
TG GND terminal
Vin input voltage
Vcs current sensor terminal voltage
Vg1 voltage at the gate terminal of the switching device Q1
Vg2 voltage at the gate terminal of the switching device Q2
i current flowing through the LED unit
$t_{OSC}$ oscillation period
t1, t2 period

The invention claimed is:

1. An LED lamp including a pair of input terminal parts; a rectifier circuit unit rectifying an AC, inputted from the outside to the pair of input terminal parts, to a DC; and an LED unit emitting light by electrification of the DC outputted from the rectifier circuit unit; the LED lamp having:
  a variable inductance unit, in a circuit between the pair of input terminal parts and the rectifier circuit unit, for causing the AC to flow from one of the pair of input terminal parts to the other input terminal part through the rectifier circuit unit;
  a current detection unit, in a circuit between the rectifier circuit unit and the LED unit, for detecting a magnitude of the DC flowing through the LED unit;
  an inductance variable control unit for making an inductance value of the variable inductance unit variable according to the magnitude of the DC detected by the current detection unit; and
  a PWM control unit, in a circuit between the rectifier circuit unit and the LED unit, capable of PWM control of a current flowing through the LED unit according to a duty ratio;
  wherein the PWM control unit is switchable between a case where the PWM control of the current flowing through the LED unit is performed, and a case where PWM control of the current flowing through the LED unit is not performed, according to a frequency of the external AC inputted to the pair of input terminal parts; and
  wherein, in the case where the PWM control unit does not perform PWM control, the current detection unit detects the magnitude of the DC flowing through the LED unit, and the inductance variable control unit makes the inductance value of the variable inductance unit variable according to the magnitude of the DC.

2. An LED lamp according to claim 1, further including a threshold element, in a circuit between the pair of input terminal parts and the rectifier circuit unit, for causing the AC to flow from one of the pair of input terminal parts to the other input terminal part through the rectifier circuit unit;
  wherein the threshold element is adapted to short-circuit both ends thereof after a lapse of a predetermined time from when the AC exceeding a predetermined threshold is inputted to the pair of input terminal parts from the outside; and
  wherein the inductance variable control unit makes the inductance value of the variable inductance unit variable according to the magnitude of the DC detected after the both ends of the threshold element are short-circuited.

3. An LED lamp according to claim 1, further including a circuit interrupt unit, in a circuit between the pair of input terminal parts and the rectifier circuit unit, capable of interrupting the AC flowing from one of the pair of input terminal parts to the other input terminal part through the rectifier circuit unit;
  wherein the circuit interrupt unit interrupts the AC when the magnitude of the DC detected by the current detection unit is higher than a predetermined upper limit or lower than a predetermined lower limit.

4. An illumination device including the LED lamp according to claim 1.

5. A current control method of an LED lamp including a pair of input terminal parts; a rectifier circuit unit rectifying an AC, inputted from the outside to the pair of input terminal parts, to a DC; and an LED unit emitting light by electrification of the DC outputted from the rectifier circuit unit, the method including the steps of:
  causing the AC, in a circuit between the pair of input terminal parts and the rectifier circuit unit, to flow from one of the pair of input terminal parts to the other input terminal part by way of the rectifier circuit unit through a variable inductance unit;
  switching between a case where the PWM control of the current flowing through the LED unit is performed, and a case where PWM control of the current flowing through the LED unit is not performed, according to a frequency of the external AC inputted to the pair of input terminal parts, wherein the switching is performed by a PWM control unit, in a circuit between the rectifier circuit unit and the LED unit, capable of PWM control of a current flowing through the LED unit according to a duty ratio;
  detecting, in the case where the PWM control unit does not perform PWM control, a magnitude of the DC flowing through the LED unit in a circuit between the rectifier circuit unit and the LED unit; and
  making an inductance value of the variable inductance unit variable according to the detected magnitude of the DC in the case where the PWM control unit does not perform PWM control;
  wherein the magnitude of the DC flowing through the LED unit is controlled so as to fall within a predetermined range.

* * * * *